US010841801B1

(12) United States Patent
Balasingh et al.

(10) Patent No.: US 10,841,801 B1
(45) Date of Patent: Nov. 17, 2020

(54) PILLAR LOCATION FOR A MOBILE DEVICE

(71) Applicant: Motorola Mobility LLC, Chicago, IL (US)

(72) Inventors: Binesh Balasingh, Naperville, IL (US); Mary Khun Hor-Lao, Chicago, IL (US); Ranjeet Gupta, Bengaluru (IN)

(73) Assignee: Motorola Mobility LLC, Chicago, IL (US)

( * ) Notice: Subject to any disclaimer, the term of this patent is extended or adjusted under 35 U.S.C. 154(b) by 0 days.

(21) Appl. No.: 16/450,518

(22) Filed: Jun. 24, 2019

(51) Int. Cl.
*H04W 12/00* (2009.01)
*H04W 4/02* (2018.01)
*H04W 64/00* (2009.01)
*H04W 12/10* (2009.01)
*H04W 4/021* (2018.01)
*H04W 4/029* (2018.01)

(52) U.S. Cl.
CPC ....... *H04W 12/1004* (2019.01); *H04W 4/021* (2013.01); *H04W 4/027* (2013.01); *H04W 4/029* (2018.02); *H04W 12/0027* (2019.01); *H04W 64/003* (2013.01)

(58) Field of Classification Search
CPC ..... H04W 4/029; H04W 4/021; H04W 4/027; H04W 12/1004; H04W 12/0027; H04W 64/993
USPC ...................................................... 455/456.2
See application file for complete search history.

(56) References Cited

U.S. PATENT DOCUMENTS 10,575,133 B2  2/2020  Guy et al.
10,757,533 B1  8/2020  Balasingh et al.
2010/0317371 A1*  12/2010  Westerinen ....... H04M 1/72566
                                                        455/456.6
2011/0099047 A1*  4/2011  Weiss .................... G06Q 10/00
                                                        705/7.34
2011/0219226 A1  9/2011  Olsson et al.
2011/0306304 A1*  12/2011  Forutanpour ....... G06F 3/04883
                                                        455/67.11
2012/0172027 A1*  7/2012  Partheesh ............. H04W 4/021
                                                        455/420
2012/0239950 A1*  9/2012  Davis .................... H04W 12/06
                                                        713/320
2012/0309413 A1  12/2012  Grosman et al.
(Continued)

OTHER PUBLICATIONS

"Wi-Fi positioning system—Wikipedia", Retrieved at: https://en.wikipedia.org/wiki/Wi-Fi_positioning_system—on Jan. 29, 2019, 4 pages.
Bonde,"Finding Indoor Position of Person Using Wi-Fi & Smartphone: A Survey", JIRST—International Journal for Innovative Research in Science & Technology| vol. 1, Issue 8, Jan. 2015, pp. 202-207.
(Continued)

*Primary Examiner* — William Nealon
(74) *Attorney, Agent, or Firm* — SBMC

(57) ABSTRACT

Techniques for pillar location for a mobile device are described, and may be implemented via a mobile device to identify frequently visited locations and to perform different tasks for the mobile device at the frequented locations. Generally, the described techniques enable a mobile device to generate precise representations of frequented locations known as "pillar locations" without relying on conventional location determination techniques. Further, specific actions can be performed when the mobile device is detected at a pillar location, such as automatically unlocking the mobile device from a locked state.

20 Claims, 25 Drawing Sheets

(56) References Cited

U.S. PATENT DOCUMENTS

| | | | |
|---|---|---|---|
| 2013/0055361 A1* | 2/2013 | Walsh | H04W 64/006 |
| | | | 726/5 |
| 2013/0115972 A1* | 5/2013 | Ziskind | H04W 4/21 |
| | | | 455/456.2 |
| 2013/0252633 A1 | 9/2013 | Liang et al. | |
| 2014/0256356 A1 | 9/2014 | Shen et al. | |
| 2014/0337123 A1 | 11/2014 | Nuernberg et al. | |
| 2014/0342733 A1 | 11/2014 | Nagaraj | |
| 2015/0011237 A1 | 1/2015 | Obermeyer et al. | |
| 2015/0105098 A1 | 4/2015 | Sridhara et al. | |
| 2016/0019257 A1 | 1/2016 | Wither | |
| 2016/0191697 A1* | 6/2016 | Chen | H04W 4/029 |
| | | | 455/411 |
| 2016/0300389 A1 | 10/2016 | Glenn et al. | |
| 2017/0193553 A1 | 7/2017 | Busch | |
| 2018/0220261 A1 | 8/2018 | Nagaraj | |
| 2020/0029271 A1 | 1/2020 | Sood | |

OTHER PUBLICATIONS

Holger, "How 'free' Wi-Fi hotspots can track your location even when you aren't connected", Retrieved at: https://www.pcworld.com/article/3315197/privacy/free-wi-fi-hotspots-can-track-your-location-even-when-you-arent-connected.html, Nov. 1, 2018, 12 pages.

Song, "WLAN Fingerprint Indoor Positioning Strategy Based on Implicit Crowdsourcing and Semi-Supervised Learning", Nov. 2017, 20 pages.

"Non-Final Office Action", U.S. Appl. No. 16/394,349, dated Oct. 3, 2019, 16 pages.

"Final Office Action", U.S. Appl. No. 16/394,349, dated Jan. 15, 2020, 20 pages.

"Advisory Action", U.S. Appl. No. 16/394,349, dated Mar. 26, 2020, 3 pages.

"Corrected Notice of Allowability", U.S. Appl. No. 16/394,349, dated Jul. 23, 2020, 2 pages.

"Notice of Allowance", U.S. Appl. No. 16/394,349, dated May 11, 2020, 8 pages.

\* cited by examiner

PILLAR LOCATION FOR A MOBILE DEVICE

BACKGROUND

Device location information can be useful for a number of purposes, such as for providing location-specific services to a user of a device based on a location of the device. Typical techniques for determining a location of a device, however, suffer from a number of drawbacks. For instance, some current techniques utilize estimated geographical coordinates (e.g., Geographical Positioning System (GPS) coordinates) to attempt to determine device location. In certain locations, however, access to geographical coordinates may be limited. For instance, some locations do not have unobstructed access to GPS signal, e.g., lack line-of-site access to GPS satellites. At such locations, GPS information for a device may be unavailable or unreliable, thus resulting in either no location information or an imprecise estimate of the geographical location of the device.

To address the drawbacks demonstrated in using geographical coordinates for device location information, some location determination techniques attempt to leverage wireless signal information available at specific locations. For instance, such techniques may utilize Wi-Fi signal received from an access point (AP) to locate a device by estimating the device's location relative to a known location of the AP. Conventional techniques for utilizing Wi-Fi signal for device location, however, also suffer from a number of drawbacks. For instance, Wi-Fi signal characteristics are prone to significant fluctuations, such as variations in signal strength and signal quality over a period of time. Further, device location determined based on a wireless signal from another device (e.g., an AP) often provides a coarse estimate of device location, and does not typically allow for more precise specification of device location.

BRIEF DESCRIPTION OF THE DRAWINGS

Aspects of pillar location for a mobile device are described with reference to the following Figures. The same numbers may be used throughout to reference similar features and components that are shown in the Figures.

DETAILED DESCRIPTION

Figure 1:
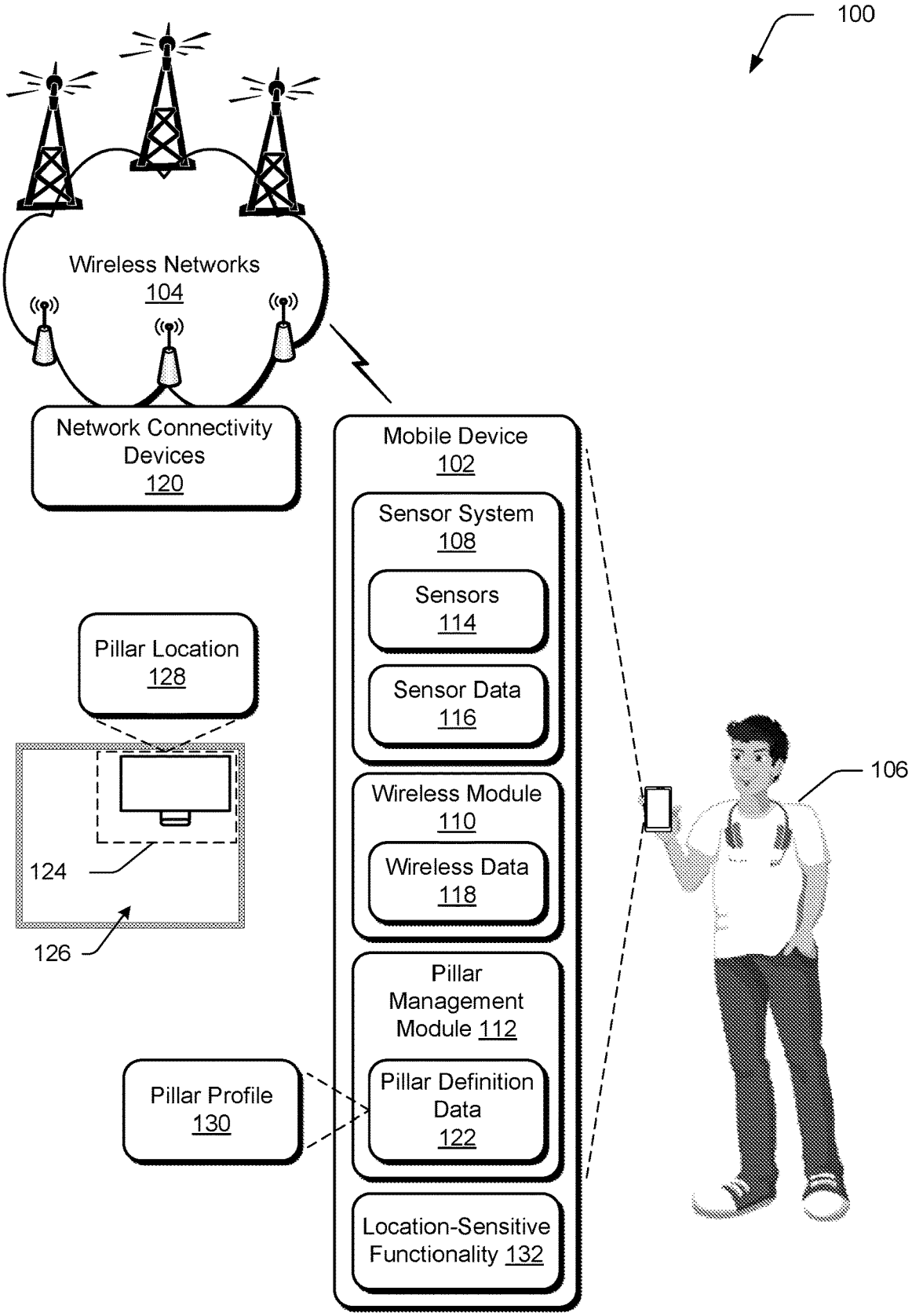
FIG. 1 illustrates an example environment in which aspects of pillar location for a mobile device can be implemented.

Techniques for pillar location for a mobile device are described, and may be implemented via a mobile device to identify frequently visited locations and to perform different tasks for the mobile device at the frequented locations. Generally, the described techniques enable the mobile device to generate precise representations of frequented locations known as "pillar locations" without relying on conventional location determination techniques. Further, specific actions can be performed when the mobile device is detected at a pillar location, such as automatically unlocking the mobile device from a locked state.

According to various implementations, motion data and wireless data pertaining to a mobile device are collected at different locations where the mobile device is present. The motion data, for instance, is collected by motion sensors of the mobile device and indicates an amount of motion of the mobile device detected at the different locations. The wireless data generally represents wireless signal information, such as identifiers for wireless networks and wireless network hardware detected at different locations. The motion data and the wireless data can then be processed to identify specific locations where the mobile device is frequently present, and to designate the locations as pillar locations.

For instance, consider a scenario where a user frequently carries a mobile device, such as a mobile phone, to their desk at work. Further, the user typically places the mobile device on their desk such that it remains stationary for periods of time. Further to techniques described herein, the mobile device detects that the device is stationary, and implements a wireless scan to collect wireless signal data. The wireless signal data, for instance, includes wireless signal information detected while the mobile device is stationary on the user's desk, such as signal information for wireless networks that are detectable at that location. This scenario may occur multiple times over a period of time (e.g., a week) such that the mobile device detects that similar and/or identical wireless signal data is present over multiple different stationary motion events of the mobile device.

Accordingly, the mobile device designates the location as a pillar location such that an action or set of actions can be performed when the mobile device is detected at the location. For instance, the wireless signal data collected at the location is utilized to generate a pillar profile for the pillar location. In at least some implementations, the mobile device detects its presence at the pillar location based on detecting the wireless signal data and without relying on conventional location determination techniques, such as GPS, cellular triangulation, and so forth. Examples of actions that can be performed based on detecting a mobile device at a pillar location include automatically unlocking the mobile device from a locked state, automatically authenticating a user on the mobile device, providing expanded access to protected content on the mobile device, providing secure geofencing as part of defining pillar locations, and so forth. For instance, multiple defined pillar locations can be combined to define a particular secure geofence. Further, multiple different pillar locations for a mobile device can be generated based on detecting locations where the mobile device is frequently stationary or exhibits reduced motion.

In at least one implementation, designating a particular location as a pillar location is subject to user verification. For instance, consider that as described above, the mobile device detects that similar and/or identical wireless signal data is present at a location over multiple different stationary motion events of the mobile device and over a period of time. Accordingly, the mobile device identifies the location as a pillar location candidate and requests user verification of the location as a pillar location. The mobile device, for example, presents a prompt for user verification, such as a visual notification requesting user input to verify the pillar location. Accordingly, in response to user verification, such as input to the prompt, the location is designated as a pillar location.

Further to techniques described herein, various aspects pertaining to a pillar location can be customized. Examples of such aspects include device, application, and system settings for a mobile device that can be user-customized for different pillar locations to provide for mobile device experiences that are tailored to individual instances of pillar locations. Further, a size and position of a pillar location can be customized. For example, when a pillar location is identified as described above, a customization user interface can be presented that enables a user to manipulate a size and/or position of the pillar location. In response to user interaction with the customization user interface, a pillar profile for the pillar location can be generated and/or updated to reflect a change in the size and/or position of the pillar location.

In addition to identifying and designating different pillar locations, the described techniques can be implemented to identify paths of movement relative to pillar locations, referred to herein as "pillar paths." A pillar path, for instance, represents a path of movement of a user carrying a mobile device when the user enters and/or exits a pillar location. Generally, a pillar path can be characterized based on a wireless signature (e.g., wireless network data) of the pillar path detected during device movement and/or displacement along the pillar path. Designating different pillar paths can be leveraged for various purposes, such as for configuring environmental attributes of a pillar location (e.g., lighting and/or temperature) in response to detecting mobile device movement along a pillar path toward the pillar location.

Further, by characterizing a pillar path based on its wireless signature, techniques can be implemented for detecting physical objects that are placed on a pillar path. For instance, consider that after a pillar path is identified based on movement data and wireless data detected by a mobile device moving along the pillar path, a physical object is placed on the pillar path, such as a chair, a box, a person, and so forth. The physical object causes a change in the wireless data along the pillar path, such as by deflecting wireless signal to cause a change in signal strength and/or by introducing noise into the wireless signal. Accordingly, the described techniques can interpret this change in wireless signal attributes as being caused by the presence of a physical object along the pillar path, and can output a notification of the object. Such notification can be useful for different purposes, such as to enable a user with impaired vision to take precautions to avoid the object.

While features and concepts of pillar location for a mobile device can be implemented in any number of different devices, systems, environments, and/or configurations, aspects of pillar location for a mobile device are described in the context of the following example devices, systems, and methods.

FIG. 1 illustrates an example environment 100 in which aspects of pillar location for a mobile device can be implemented. The example environment 100 includes a mobile computing device ("mobile device") 102 that is connectable to wireless networks 104. In this particular example, the mobile device 102 represents a portable device that can be carried by a user 106, such as a smartphone, a tablet device, a laptop, a wearable computing device, (e.g., a smartwatch or a fitness tracker), and so forth. These examples are not to be construed as limiting, however, and the mobile device 102 can be implemented in a variety of different ways and form factors. Further example attributes of the mobile device 102 are discussed below with reference to the device 2500 of FIG. 25.

The mobile device 102 includes various functionality that enables the mobile device 102 to perform different aspects of pillar location for a mobile device discussed herein, including a sensor system 108, a wireless module 110, and a pillar management module 112. The sensor system 108 is representative of functionality to detect various physical and/or logical phenomena in relation to the mobile device 102, such as motion, light, image detection and recognition, time and date, position, location, touch detection, temperature, and so forth. To enable the sensor system 108 to detect such phenomena, the sensor system 108 includes sensors 114 that are configured to generate sensor data 116. Examples of the sensors 114 include hardware and/or logical sensors such as an accelerometer, a gyroscope, a camera, a microphone, a clock, biometric sensors, touch input sensors, position sensors, environmental sensors (e.g., for temperature, pressure, humidity, and so on), and so forth. In at least some implementations, the sensor data 116 represents raw sensor data collected by the sensors 114. Alternatively or in addition, the sensor data 116 represents raw sensor data from the sensors 114 that is processed to generate processed sensor data, such as sensor data from multiple sensors 114 that is combined to provide more complex representations of mobile device 102 states than can be provided by a single sensor 114.

The wireless module 110 represents functionality (e.g., hardware and logic) that enables the mobile device 102 to communicate wirelessly, such as for wireless data and voice communication. The wireless module 110, for instance, includes functionality to support different wireless protocols, such as wireless cellular (e.g., 3G, 4G, 5G), wireless broadband, Wireless Local Area Network (WLAN) (e.g., Wi-Fi), Wi-Fi Direct, Neighborhood Awareness Networking (NAN), wireless short distance communication (e.g., Bluetooth™ (including Bluetooth™ Low Energy (BLE)), Near Field Communication (NFC)), and so forth. The wireless module 110 generates and/or maintains wireless data 118, which is representative of various types of data that is used and/or observed by the wireless module 110. The wireless data 118, for instance, includes attributes of wireless signal received and/or detected by the wireless module 110, such as received signal strength indicator (RSSI), service set identifiers (SSIDs), basic service set identifiers (BSSIDs), capabilities information elements (IEs), signal frequency band, Wi-Fi channels, signal quality (e.g., signal-to-noise (S/N) ratio), and so forth.

In at least one implementation, the wireless module 110 wirelessly connects the mobile device 102 to the wireless networks 104 via interaction between the wireless module 110 and network connectivity devices 120. Generally, the network connectivity devices 120 are representative of functionality to receive and transmit wireless signal and serve as access portals for the wireless networks 104. Examples of the network connectivity devices 120 include a wireless cellular base station, a wireless access point (e.g., for a WLAN and/or a Wireless Wide Area Network (WWAN)), a short-range wireless network access point, and so forth. The network connectivity devices 120 may also include non-access point devices that utilize wireless communication, such as wireless peripherals (e.g., wireless printers), wireless appliances, Internet of Things (IoT) devices, and so forth. Thus, the wireless data 118 may include data that describes wireless signal transmitted by the network connectivity devices 120.

Further to the mobile device 102, the pillar management module 112 represents functionality to perform various aspects of techniques for pillar location for a mobile device described herein. For example, the pillar management module 112 utilizes portions of the sensor data 116 and the wireless data 118 to generate pillar definition data 122 that defines different pillar locations for the mobile device 102 and/or the user 106. For instance, utilizing the sensor data 116 and the wireless data 118, the pillar management module 112 determines that the mobile device 102 is frequently present at a location 124. The location 124, for instance, represents a sublocation within a point of interest 126. For instance, the point of interest 126 represents a room (e.g., an office where the user 106 works) and the location 124 represents a desk within the room. Accordingly, by processing the sensor data 116 and the wireless data 118 (as detailed extensively below), the pillar management module 112 defines the location 124 as a pillar location 128 and generates a pillar profile 130 for the pillar location 128 within the pillar definition data 122. The pillar profile 130, for instance, includes environmental attributes present at the pillar location 128, such as wireless signal attributes that are detectable at the pillar location 128.

According to implementations discussed herein, the pillar location 128 can be leveraged for various purposes. For instance, when the pillar management module 112 detects that the mobile device 102 is present at the pillar location 128, the pillar management module 112 can perform a particular task that is defined for locations designated as pillar locations. The pillar management module 112, for instance, can signal a location-sensitive functionality 132 of the mobile device 102 that the mobile device 102 is present at the pillar location 128. Generally, the location-sensitive functionality 132 represents functionality that can perform different tasks based on a location of the mobile device 102. Examples of the location-sensitive functionality 132 include an application, a service, a system process of the mobile device 102, and so forth. In one example implementation, the location-sensitive functionality 132 unlocks the mobile device 102 in response to determining that the mobile device 102 is present at the pillar location 128.

For instance, when the user 106 is in possession of the mobile device 102 at a location outside of the pillar location 128, the mobile device 102 may be in a locked state where the mobile device 102 is powered on but certain functionality of the mobile device 102 (e.g., applications and system services) is disabled. When the user 106 carries the mobile device 102 within the pillar location 128 and the pillar management module 112 determines that the mobile device 102 is present at the pillar location 128, the pillar management module 112 signals the location-sensitive functionality 132 and the location-sensitive functionality 132 unlocks the mobile device 102, e.g., enables the functionality of the mobile device 102 that was disabled in the locked state.

Further to techniques described herein, the mobile device 102 may also automatically lock (e.g., relock) the mobile device 102 when the user 106 carries the mobile device 102 outside of the pillar location 128. For instance, when the pillar management module 112 detects that the mobile device 102 moves outside of the pillar location 128, the pillar management module 112 signals the location-sensitive functionality 132 that the mobile device 102 has exited a pillar location. Accordingly, the location-sensitive functionality 132 locks the mobile device 102. The lock/unlock paradigm is presented as but one example, and it is to be appreciated that various other tasks and processes can be performed based on pillar entry and exit events.

Figure 2:
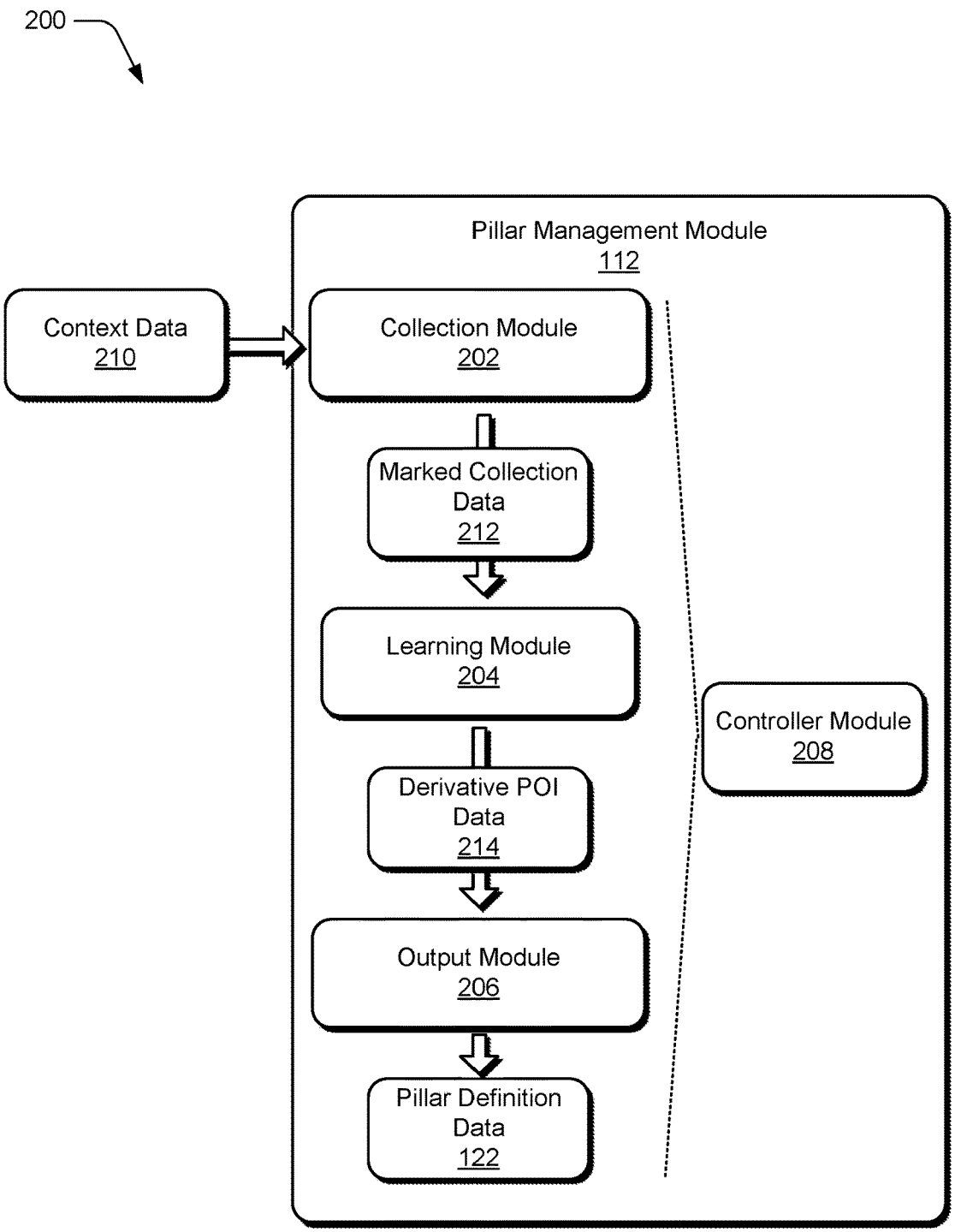
FIG. 2 depicts a system with details of a pillar management module in accordance with one or more implementations.

FIG. 2 depicts a system 200 with details of the pillar management module 112 introduced above. Generally, the pillar management module 112 includes different modules that control different aspects and processes pertaining to pillar location for a mobile device. For instance, the pillar management module 112 includes a collection module 202, a learning module 204, an output module 206, and a controller module 208. Each of these modules performs a particular set of tasks to enable the pillar management module 112 to generate the pillar definition data 122.

The collection module 202, for instance, collects context data 210 pertaining to the mobile device 102. The context data 210, for instance, represents various environmental and logical data (e.g., wireless logical data) that can be used to characterize a context of the mobile device 102. Examples of the context data 210 include the wireless data 118 collected from a surrounding environment, the sensor data 116 received from the sensor system 108, system context received from different system functionalities of the mobile device 102, and so forth. Using the context data 210, the collection module 202 generates marked collection data 212 that is used to identify and define pillar locations. The learning module 204 takes the marked collection data 212 generated by the collection module 202, and processes the marked collection data 212 to generate derived point of interest ("POI") data 214 that is usable by the output module 206 to generate pillar identities. Accordingly, the output module 206 processes the derived POI data 214 and generates the pillar definition data 122. Finally, the controller module 208 serves as a moderator for the other modules and can cause the individual modules and/or the system as a whole to transition between different operational states. For example, the controller module 208 can control when to transition between different data collection states of the collection module 202, between different learning states of the learning module 204, and different output states of the output module 206. More detailed operations of interactions of this system are now discussed.

Figure 3:
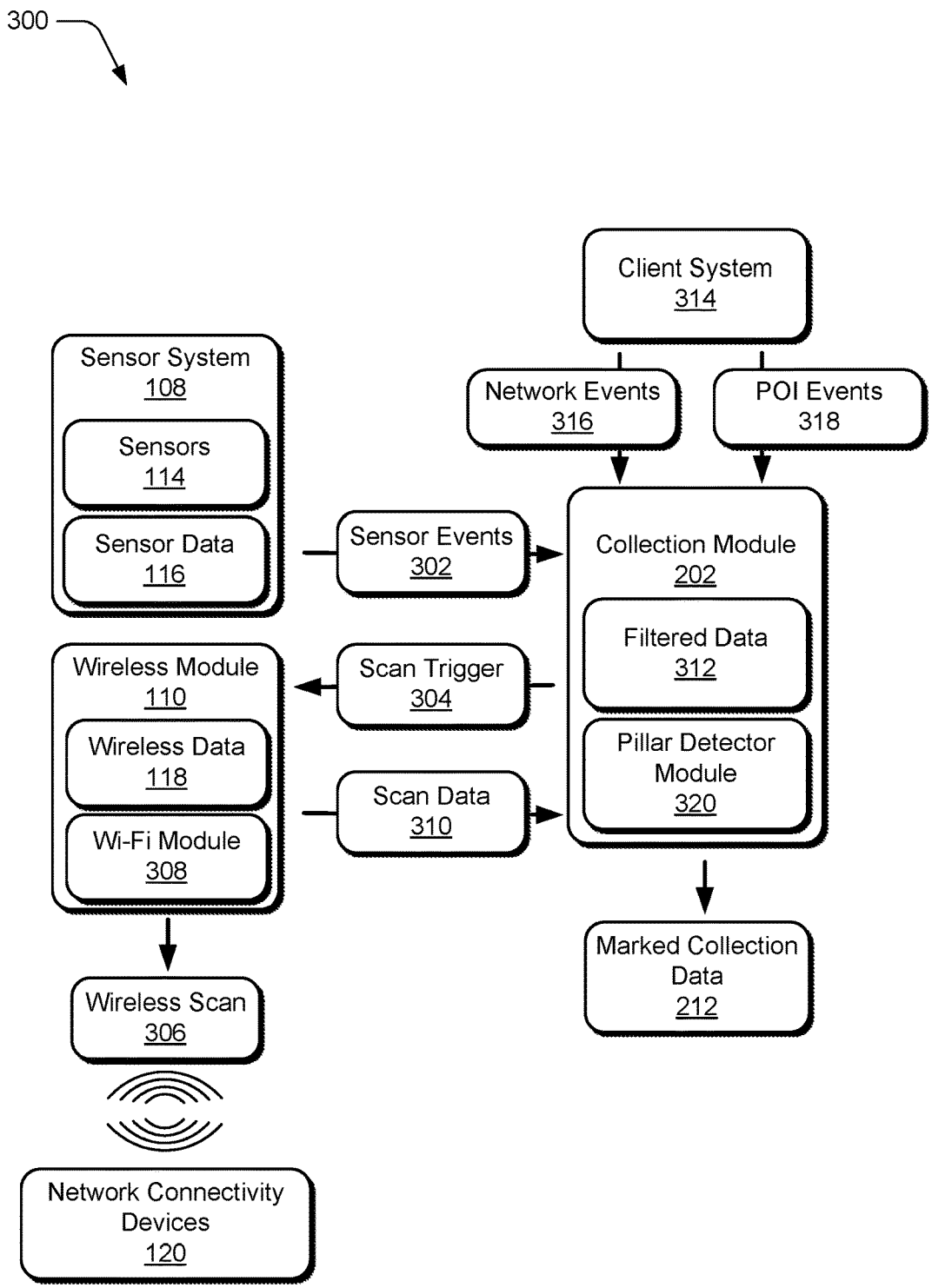
FIG. 3 depicts a system showing example operation of a collection module in accordance with one or more implementations.

FIG. 3 depicts a system 300 showing example operation of the collection module 202. Generally, the collection module 202 represents functionality that gathers data utilized by the pillar management module 112 to identify locations to be marked as pillar locations, such as in the pillar definition data 122.

In the system 300, the sensor system 108 generates sensor events 302 in response to phenomena detected by the sensors 114. One primary example of a sensor event 302 is a motion event generated by the sensor system 108 based on a sensor 114 detecting motion of the mobile device 102. For instance, when the user 106 picks up the mobile device 102 and moves to a different location, the sensor system 108 fires a sensor event 302 to the collection module 202 identifying the motion. In at least one implementation, a motion event represents motion data collected by a motion sensor of the sensor system 108, such as inertial motion information collected from a gyroscope, an accelerometer, and/or other types of motion sensors to sense motion of the device.

The collection module obtains the wireless data 118 from the wireless module 110, such as in response to receiving the sensor events 302. For instance, the collection module 202 communicates a scan trigger 304 to the wireless module 110 requesting that the wireless module 110 scan for wireless networks. The scan trigger 304, for instance, specifies parameters for a wireless scan, such as network type(s) to be scanned for, an identity of a specific network to be scanned for, and/or how frequently scans are to be performed. Accordingly, the wireless module 110 performs a wireless scan 306 that scans for detectable wireless networks. In at least one implementation, the wireless module 110 utilizes a Wi-Fi module 308 to perform the wireless scan 306 for Wi-Fi signal. The Wi-Fi module 308, for instance, represents a dedicated integrated circuit that can scan for and detect Wi-Fi signal. For example, the Wi-Fi module 308 implements the wireless scan 306 to detect Wi-Fi signal transmitted by instances of the network connectivity devices 120.

Based on the wireless scan 306, the wireless module 110 generates scan data 310 that includes results of the wireless scan 310, and communicates the scan data 310 to the collection module 202. The scan data 310 can include various types of information, such as network identifiers, identifiers for detected network connectivity devices 120 (e.g., basic service set identifiers (BSSIDs)), types of wireless networks identified (e.g., Wi-Fi, wireless cellular, mesh network, and so forth), attributes of detected wireless signal (e.g., frequency band and channel, RSSI, and/or signal quality), and so forth. In at least some implementations, the collection module 202 filters the scan data to generate filtered scan data ("filtered data") 312. To generate the filtered data 312, for instance, the collection module 202 removes scan data 310 from wireless networks and/or wireless connectivity devices 120 that are determined to be unreliable for use in determining location. The scan data 310 may be filtered in various ways to generate the filtered data 312, such as based on BSSIDs for network connectivity devices 120 that are known to be disallowed for determining location. Examples of such disallowed devices include peer-to-peer devices (e.g., mobile devices used as hotspots), mesh network devices, devices that use hidden SSIDs, and other devices that are determined to be unreliable for use in determining location.

The collection module 202 also receives various types of data from a client system 314. The client system 314, for instance, represents system-level functionality of the mobile device 102, such as an operating system that manages various system tasks for the mobile device 102. In operation, the client system 314 provides network events 316 and point of interest ("POI") events 318 to the collection module 202. The network events 316, for instance, represent connectivity events that indicate when the mobile device 102 connects to a wireless network 104 (e.g., one of the network connectivity devices 120), and/or disconnects from a wireless network 104. The POI events 318 signal to the collection module 202 when the mobile device 102 enters or exits a POI. In some example implementations, the POI events 318 are based on the client system 314 detecting that the mobile device 102 enters and/or exits a geofence defined for the mobile device 102.

Based on the various data and events received by the collection module 202, the collection module 202 generates and outputs the marked collection data 212. Examples of the marked collection data 212 include:

Timestamped RSSI data, such as collected when the mobile device 102 is determined to be within a POI. This data, for instance, is based on the filtered data 312 generated from the scan data 310 and can identify networks 104 and/or network connectivity devices 120 that are detected based on the wireless scan 306.

Timestamped motion events that identify motion activity of the mobile device 102 at specific times. This data can be generated based on the sensor events 302 and timestamped by the collection module 202. Generally, the timestamped motion events can identify when the mobile device 102 is actively in motion, e.g., when the user 106 is carrying the mobile device 102 while in motion. Further, the timestamped motion events can identify when the mobile device 102 is not in motion.

Identifiers for networks 104 and/or network connectivity devices 120 (e.g., BSSIDs) to which the mobile device 102 connects, such as determined based on the network events 316.

Other tagged sensor data, such as from the sensor system 108.

To assist in generating the marked collection data 212, the collection module 202 leverages a pillar detector module 320 which represents functionality for performing different tasks of the collection module 202, such as controlling how frequently wireless scans are requested from the wireless module 110, and timestamping motion data relative to POI entry and exit events. A detailed discussion of the pillar detector module 320 is now presented.

Figure 4:
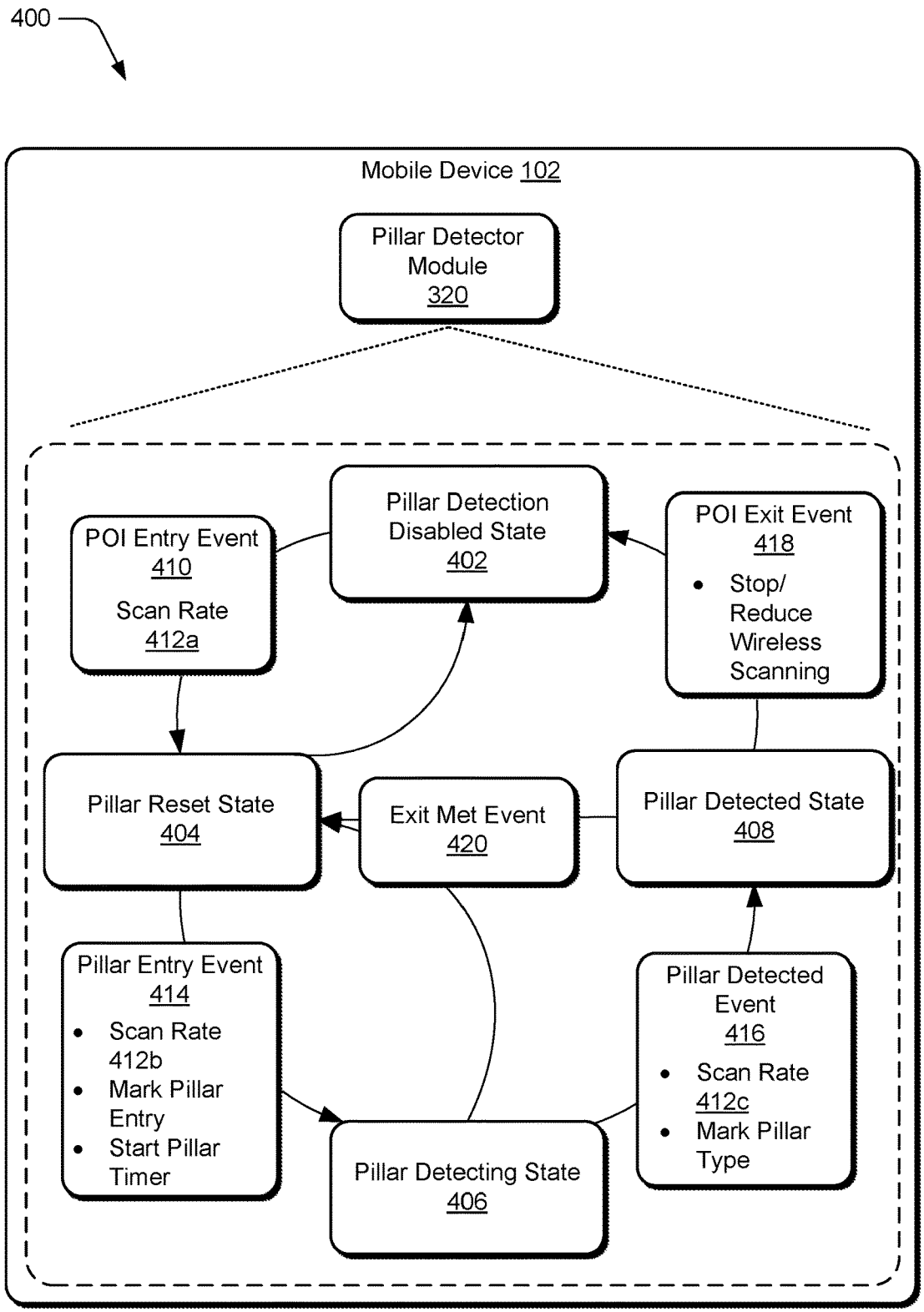
FIG. 4 depicts a scenario that demonstrates operational attributes of a pillar detector module in accordance with one or more implementations described herein.

FIG. 4 depicts a scenario 400 that demonstrates operational attributes of the pillar detector module 320. Generally, depending on a detected context of the mobile device 102, the pillar detector module 320 can transition between different states and perform different actions to assist the collection module 202 in generating the marked collection data 212. In this example, the pillar detector module 320 includes a pillar detection disabled state 402, a pillar reset state 404, a pillar detecting state 406, and a pillar detected state 408. In operation, transitioning the pillar detector module 320 between these different states occurs based on detected motion of the mobile device 102, e.g., based on sensor events 302 that indicate motion.

For instance, consider that when the mobile device 102 is determined to be outside of a POI (e.g., based on data from the POI events 318), the pillar detector module 320 is in the detection disabled state 402. In the detection disabled state 402, the pillar detector module 320 may signal the wireless module 110 to suspend wireless scans, or to perform wireless scans less frequently than would occur within a POI. Continuing, the pillar detector module 320 detects a POI entry event 410 indicating that the mobile device 102 enters an area designated as a POI. The POI entry event 410, for instance, represents a POI event 318 received from the client system 314. In response to the POI entry event 410, the pillar detector module 320 transitions to the pillar reset state 404 and signals the wireless module 110 to begin performing wireless scans according to a scan rate 412a. In one example, the scan rate 412a is specified as 0.03 Hertz (Hz).

While in the pillar reset state 404, the pillar detector module 320 can receive various motion-related events. For instance, the pillar detector module 320 can detect a pillar entry event 414 based on relative motion of the mobile device 102, such as based on motion information from the sensor events 302. In at least one implementation, the pillar entry event 414 is based on detecting a lack of motion of the mobile device 102 for a specific period of time, such as a predefined period of time. Responsive to the pillar entry event 414, the pillar detector module 320 switches to the pillar detecting state 406 and signals the wireless module 110 to begin performing wireless scans according to a scan rate 412b. In one example, the scan rate 412b has a higher frequency than the scan rate 412a. The scan rate 412b, for instance, is specified as 0.1 Hz.

Further based on the pillar entry event 414, the pillar detector module 320 marks a pillar entry data point and starts a pillar timer. Thus, the pillar timer runs while the pillar detector module 320 is in the pillar detecting state 406.

When the pillar timer elapses (e.g., expires) and the pillar detector module 320 is still in the pillar detecting state 406, the pillar detector module 320 detects a pillar detected event 416 and transitions to the pillar detected state 408. For instance, the pillar detector module 320 transitions from the pillar detecting state 406 to the pillar detected state 408 in response to expiration of the pillar timer with little or no motion of the mobile device 102 detected in the meantime.

As part of the pillar detected event 416, the pillar detector module 320 signals the wireless module 110 to begin performing wireless scans according to a scan rate 412c. In one example, the scan rate 412c has a lower frequency than the scan rate 412b. The scan rate 412c, for instance, is specified as 0.03 Hz.

In the pillar detected state 408, the pillar detector module 320 marks a pillar location with a pillar type. According to one or more implementations, different pillar types can be identified based on motion events detected while in the pillar detecting state 406. For instance, one pillar type is designated as a "stationary pillar," and another pillar type is designated as a "variable pillar." Generally, the differences between a stationary pillar location and a variable pillar location are based on motion events detected by the pillar detector module 320 while gathering data for defining a pillar location. More details concerning how a stationary pillar location is differentiated from a variable pillar location are provided below.

While in the pillar detected state 408, if the mobile device 102 is detected as leaving the POI, a POI exit event 418 is detected and the pillar detector module 320 returns to the detection disabled state 402. As mention previously, in the detection disabled state 402, the pillar detector module 320 may signal the wireless module 110 to suspend wireless scans, or to perform wireless scans infrequently.

In addition to the state transitions discussed above, several other state transitions of the pillar detector module 320 may occur. For instance, consider that while the pillar detector module 320 is in the pillar detecting state 406 or the pillar detected state 408, the collection module 202 receives a motion event from the sensor system 108 indicating motion of the mobile device 102 while remaining in the POI. In this scenario, the pillar detector module 320 may detect an exit met event 420 that causes the pillar detector module 320 to return to the pillar reset state 404.

Further, consider that while the pillar detector module 320 is in the pillar reset state 404 or the pillar detecting state 406, the collection module 202 detects that the mobile device 102 leaves the POI. Accordingly, the pillar detector module 320 detects a POI exit event 418, and the pillar detector module 320 transitions to the detection disabled state 402.

As mentioned previously, techniques described herein can be leveraged to define multiple pillar types, including a stationary pillar location and a variable pillar location. Generally, the difference in defining these two pillar types is based on an amount of device motion detected while collecting pillar data for defining the respective pillars. For instance, with reference to the pillar detector module 320, the difference between designating a pillar location as a stationary pillar or a variable pillar can be based on motion detected at different states of the pillar detector module 320.

Consider, for example, the pillar entry event 414 for transitioning from the pillar reset state 404 to the pillar detecting state 406. To define a stationary pillar location, the pillar entry event 414 may be based on detecting no motion of the mobile device 102 while in the pillar reset state 404. For a variable pillar location, however, the pillar entry event 414 may be based on detecting limited motion of the mobile device 102 while in the pillar reset state 404. For instance, a threshold amount of movement may be defined for the pillar entry event 414, such as a threshold duration of movement in seconds. If no motion of the mobile device 102 is detected while in the pillar reset state 404, the pillar entry event 414 may be triggered and the pillar detector module 320 may transition from the pillar reset state 404 to the pillar detecting state 406 according to a stationary pillar detecting mode. However, if motion of the mobile device 102 is detected while in the pillar reset state 404 but the motion does not exceed the threshold amount of movement, the pillar entry event 414 may be triggered and the pillar detector module 320 may transition from the pillar reset state 404 to the pillar detecting state 406 according to a variable pillar detecting mode. Generally, this allows for a variable pillar location to be defined for locations where the mobile device 102 may remain in the same general area but still be occasionally in motion, such as when a user holds and interacts with the mobile device 102 while sitting or standing at a particular location, which causes limited motion of the mobile device 102 incidental to the user interaction.

Differences between a stationary pillar location and a variable pillar location may also be reflected in criteria for the exit met event 420. For instance, in defining a stationary pillar location, any detected motion of the mobile device 102 while within a POI may trigger the exit met event 420 and cause the pillar detector module 320 to transition from the pillar detecting state 406 or the pillar detected state 408 to the pillar reset state 404. However, in defining a variable pillar location, limited motion of the mobile device 102 may be permitted without triggering the exit met event 420. For instance, the motion threshold discussed above may be employed such that detected motion of the mobile device 102 that does not exceed the motion threshold while in the pillar detecting state 406 or the pillar detected state 408 does not trigger the exit met event 420.

In at least one implementation, multiple instances of the pillar detector module 320 can execute in parallel, including a first instance configured for stationary pillar detection and a second instance configured for variable pillar detection. Thus, the first instance can be configured to fire a pillar entry event 414 in response to detecting no motion of the mobile device 102, and to fire an exit met event 420 in response to detecting any motion of the mobile device. The second instance of the pillar detector module 320, however, can be configured to fire a pillar entry event 414 while detecting limited motion of the mobile device 102 (e.g., motion within a threshold), and to fire an exit met event 420 in response to detecting motion of the mobile device that exceeds a specified amount of motion, e.g., a motion threshold.

Figure 5:
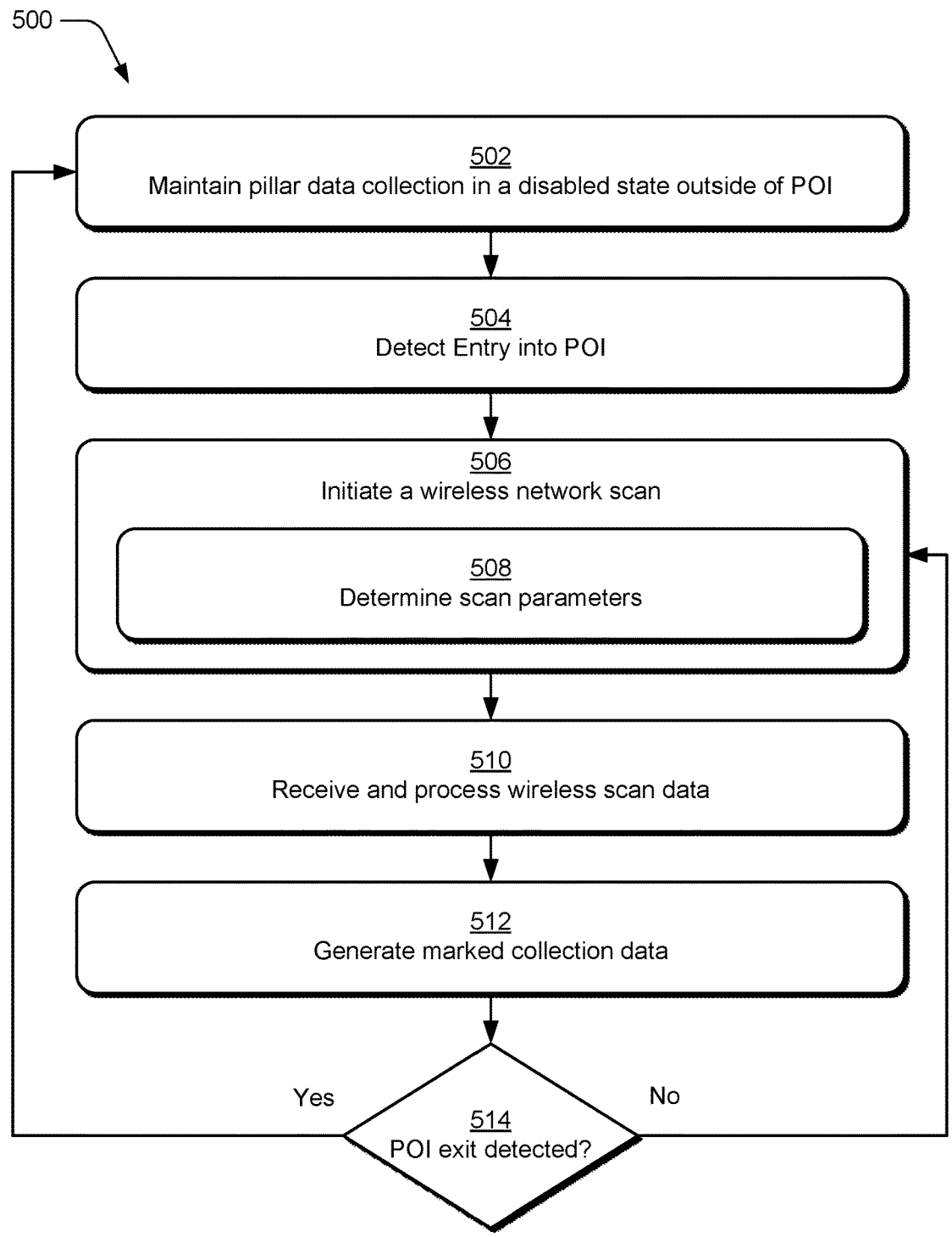
FIG. 5 illustrates an example method describing example operations for collecting context data pertaining to a mobile device in accordance with one or more implementations described herein.

FIG. 5 illustrates example method 500 describing example operations for collecting context data pertaining to a mobile device, such as operations of the collection module 202.

At 502, pillar data collection is maintained in a disabled state outside of a POI. The pillar detector module 320, for instance, maintains the collection module 202 in an inactive state when the mobile device 102 is determined to be outside of a POI. As further detailed below, the controller module 208 can control operation of the collection module 202 based on detecting POI entry and exit events.

At 504, a POI entry event is detected. The collection module 202, for example, receives a POI entry event, such as from the client system 314 and/or the controller module 208. At 506, a wireless network scan is initiated. For instance, the collection module 202 instructs the wireless module 110 to initiate a wireless scan, and/or to increase its wireless scan rate. At 508, as part of initiating the wireless network scan, scan parameters for the wireless network scan are determined. The wireless module 110, for instance, determines the scan rate for the wireless scan based on various factors and/or state information, such as the sensor data 116 from the sensor system 108. For example, if the sensor data 116 indicates little or no movement of the mobile device 102, the scan rate can be set at a low frequency. However, if the sensor data 116 indicates significant movement of the mobile device 102, the scan rate can be set at a higher frequency. Thus, the scan rate can be adjusted based on an amount of detected movement of the mobile device 102. In another example, the scan parameters indicate whether the wireless scan is to be a full wireless scan, a partial wireless scan, a bucket scan, or a passive scan, such as based on context determined from the sensor data 116.

At 510, wireless scan data is received and processed. As an example, the collection module 202 receives wireless data 118 from the wireless module 110 that includes various attributes of a wireless signal environment surrounding the mobile device 102. The collection module 202 can then process the wireless data 118, such as by filtering out wireless data from disallowed network connectivity devices 120.

At 512, marked collection data is generated. The wireless data 118 that remains after being processed (e.g., filtered) can then be timestamped to reflect a time and date on which the data was collected. Further, the remaining wireless data 118 can be motion stamped to identify motion events that occurred in conjunction (e.g., concurrently) with collection of the wireless data. Generally, this step can be performed to generate the marked collection data 212.

At 514, a determination is made whether a POI exit event is detected. If a POI exit event is detected ("Yes"), the method returns to step 502. The collector module 202, for instance, stops collecting context data for the mobile device 102. In at least one implementation, the collector module 202 instructs the wireless module 110 to reduce its scan rate, or to stop wireless scanning. If a POI exit event is not detected ("No"), the method returns to steps 506, 508 where scan parameters are determined (e.g., scan rate and/or type) and a wireless scan is performed based on the determined parameters.

Figure 6:
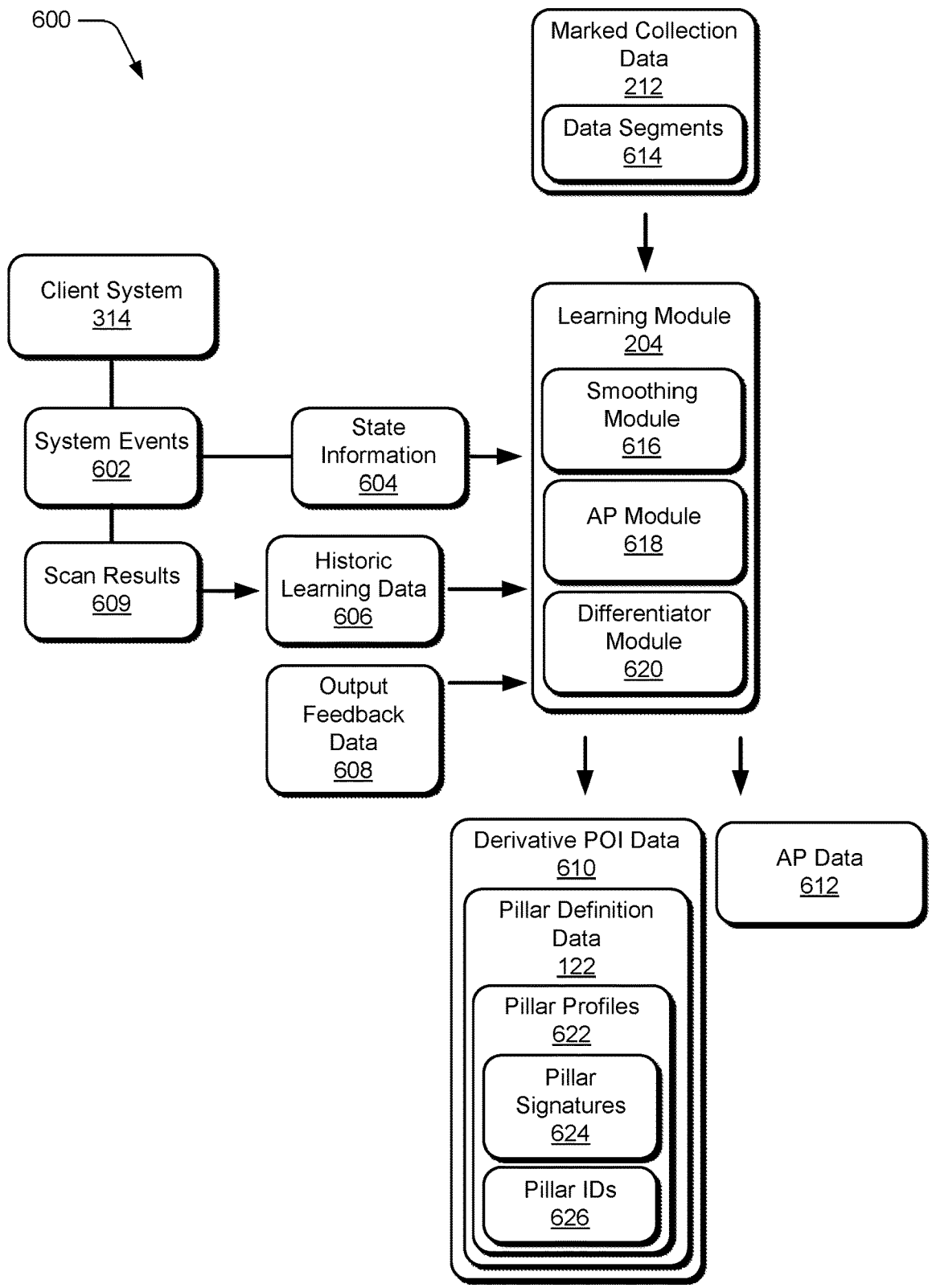
FIG. 6 depicts a system showing example operations of a learning module in accordance with one or more implementations described herein.

FIG. 6 depicts a system 600 showing example operation of the learning module 204. Generally, the learning module 204 represents functionality that takes the data collected by the collection module 202, and processes the data to put it in a form that enables different pillars to be defined based on the data.

In the system 600, the learning module 204 receives various types of data from other portions of the mobile device 102. For instance, the learning module 204 receives the marked collection data 212 from the collection module 202. Further, the client system 314 provides system events 602 and system state information 604 to the learning module 204. Generally, the system events 602 represent changes in context that occur in relation to the mobile device 102, such as POI entry and exit events, network connectivity events (e.g., connection and disconnection from a Wi-Fi network), and so forth. The state information 604 represents different state conditions for the mobile device 102, such as date, time, battery level, charging state (e.g., charging or not charging), and so forth.

The learning module 204 also accesses historic learning state ("historic learning") data 606 and output feedback state ("output feedback") data 608, such as from a data storage of the mobile device 102. The historic learning data 606 represents data generated during previous data processing performed by the learning module 204, examples of which are discussed below. In this particular example, the client system 314 provides scan results 609 that are populated to the historic learning data 606. The scan results 609, for instance, represent raw data collected as part of Wi-Fi scan samples that are collected and utilized as part of the historic learning dtaa 606.

The output feedback data 608 represents feedback regarding output from the output module 206. The output feedback data 608, for instance, includes data reflecting how accurately and/or precisely a pillar location was identified by the pillar management module 112. Generally, the output feedback data 608 may be generated in different ways, such as by the output module 206, based on user feedback, and so forth.

The learning module 204 takes this various data as input, and generates derivative POI data 610 and access point ("AP") data 612. As further detailed below, the derivative POI data 610 is usable by the learning module 204 to generate instances of pillar locations. Further, the AP data 612 is usable to determine which APs are triggers for identifying pillar locations, which APs are useful for identifying pillars, and which are not.

To generate the derivative POI data 610, the learning module 204 performs various types of processing on the marked collection data 212. In at least one implementation, the marked collection data 212 is divided into data segments 614 based on POI entry and exit events and motion events. For instance, individual data segments 614 correspond to data that was collected within respective POIs, such as data collected by the collection module 202 between POI entry events and POI exit events. Thus, in at least one implementation, the learning module 204 can process the marked collection data 212 on a per-data segment 614 basis.

Examples of the processing performed by the learning module 204 to generate the derivative POI data 610 and the AP data 612 include:

RSSI Data Smoothing: The learning module 204 leverages a smoothing module 616 to implement an interpolation function to "fill in" missing scan results from raw scan data received based on wireless scans performed by the wireless module 110. For instance, due to variations in device behavior and/or environmental conditions, certain BSSIDs may appear sporadically in a batch of wireless scan data. Thus, the smoothing module 616 can smooth wireless scan readings across a batch of wireless scans to provide a more usable representation of RSSI readings.

Access Point Grouping: The learning module 204 leverages an AP module 618 to group AP IDs that belong to the same AP, and/or APs that are close enough in proximity to be indicated as being located at the same location.

Preferred Access Point Selection: The learning module 204 also leverages the AP module 618 to select APs that are preferred APs for use in defining pillars. Generally, a preferred AP represents an AP that demonstrates stable performance attributes (e.g., stable detected RSSI), and APs to which the mobile device 102 connects are typically preferred over those that are detected in a wireless scan but to which the mobile device 102 does not connect. In at least some implementations, AP data obtained from the RSSI smoothing performed by the smoothing module 616 can be utilized for selecting preferred APs, such as by utilizing the entropy and mean of the smoothed RSSIs. Further, to ensure minimal representation of an AP, a bucket filter can be utilized to filter the smoothed RSSI data.

Generation of derivative data pertaining to combinatorial RSSI space tessellation and joint probability distributions. In at least one implementation, derivative data can be generated by a process including:

(1) Combinatorically picking up T "sub-spaces" corresponding to each of n APs.
(2) For each "sub-space," running a common machine learning unsupervised algorithm on the smoothed RSSI data, such as but not limited to k-means clustering, spectral clustering of eigenvectors, and so forth.
(3) Computing a "cluster number" (e.g., the minimal Euclidean distance from a cluster centroid) for random data samples within the pillar markings and those outside including random perturbation for "walk/pillar transition."
(4) Computing the joint probability associated with a number of data points in each cluster number for categories (Pillar, Other Pillar, walk) for each subspace.
(5) And then storing:
  a. The joint probability tables per pillar, per subspace per category;
  b. The centroid coordinates for various subspaces per pillar; and
  c. The smoothed RSSI "random" pillar data samples picked for the calculations in step 3.

Pillar Differentiation: The learning module 204 leverages a differentiator module 620 to determine whether two or more distinctly identified pillars should have coalesced as a single pillar. For instance, the differentiator module 620 processes the marked collection data 212 using derivative data thresholding and by examining metrics on probability distribution divergence to identify ephemeral APs, such as hotspot APs that only appear occasionally at a particular location and thus should not be used for pillar identification. The difference between two different identified pillars, for instance, may reside in a single ephemeral AP such that when the ephemeral AP is removed from consideration, the pillars are determined to be a single pillar and thus are coalesced as a single logical representation of a pillar within a particular POI.

According to various implementations, processing tasks of the learning module 204 are performed at particular times and/or based on particular device states, such as when the mobile device 102 is charging (e.g., plugged into AC power) and/or at night when the mobile device 102 is typically not being used by the user 106. Generally, processing of the learning module 204 is scheduled to reduce the impact on power and battery resources, e.g., to minimize impact on user experience.

Thus, based on the various processing performed by the learning module 204, the learning module 204 generates the derivative POI data 610 to include the pillar definition data 122, which in turn includes pillar profiles 622 for pillar locations identified based on the derivative POI data 610. For each pillar profile 622, the learning module 206 includes pillar signatures 624 and generates a pillar ID 626 that identifies a respective pillar location and differentiates the pillar location from other pillar locations identified in the pillar profiles 622. In at least one implementation, a pillar signature 624 for each pillar profile 622 include a wireless signature for a respective pillar location, such as BSSIDs for network connectivity devices 120 detected in the pillar location, RSSI signature, network ID(s), and so forth.

Figure 7:
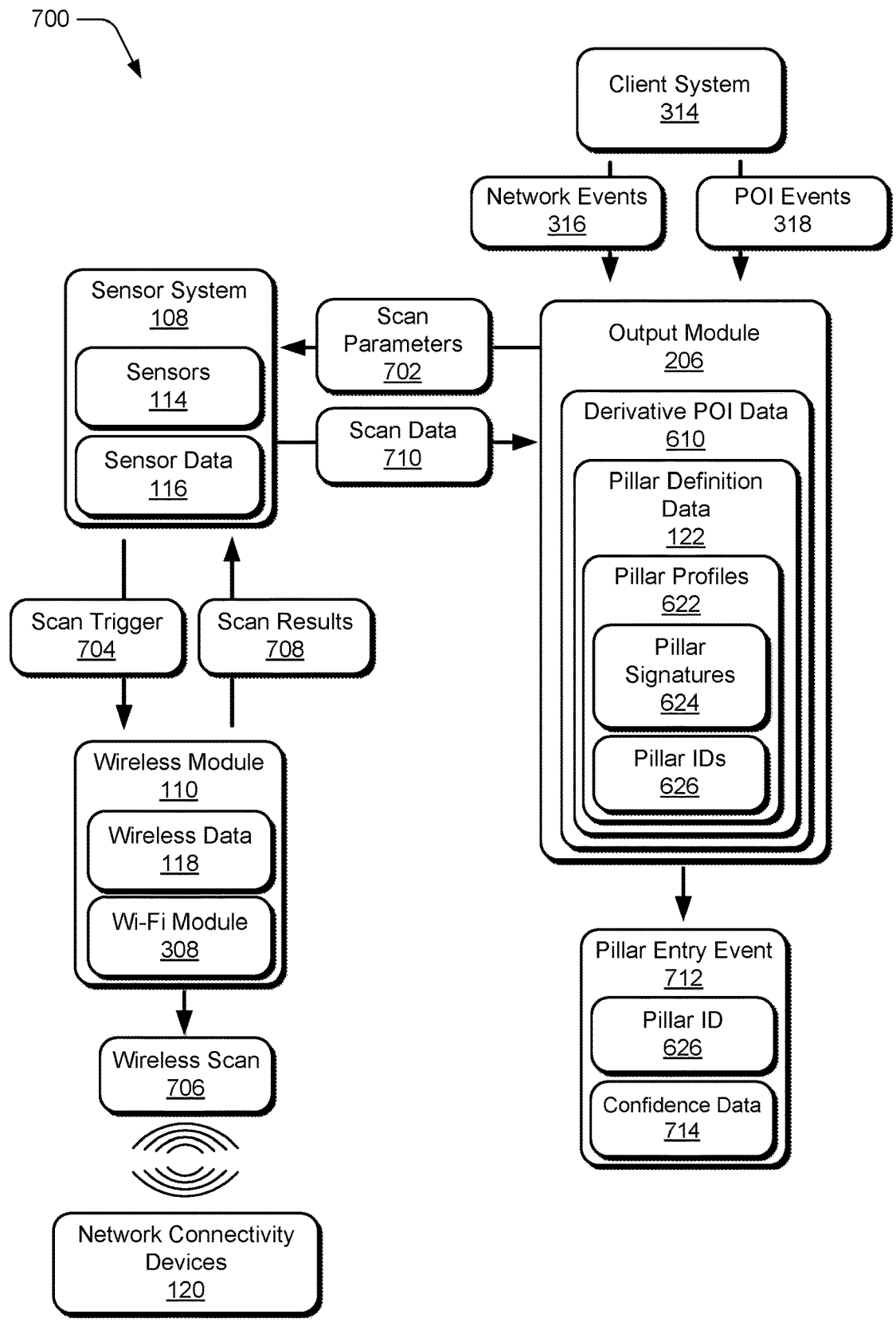
FIG. 7 depicts a system showing example operations of an output module in accordance with one or more implementations described herein.

FIG. 7 depicts a system 700 showing example operations of the output module 206. Generally, the output module 206 represents functionality that takes the derivative POI data 610 generated by the learning module 204, and utilizes the data to output events pertaining to detected pillar locations.

In the system 700, the output module 206 receives various data generated by other portions of the mobile device 102. For instance, the output module 206 receives the derivative POI data 610 generated by the learning module 204 as well as the network events 316 and POI events 318 from the client system 314.

In operation, the output module 206 provides scan parameters 702 to the sensor system 108 for use in instructing the wireless module 110 to perform wireless scans. The scan parameters 702, for instance, identify motion events that are to be interpreted by the sensor system 108 as triggers for instructing the wireless module 110 to perform a wireless scan. In one example implementation, the scan parameters 702 specify that when an amount of motion of the mobile device 102 is below a motion threshold (e.g., based on duration of motion), a wireless scan it to be triggered.

Accordingly, when the sensor system 108 detects a motion event that corresponds to the scan parameters 702, the sensor system 108 communicates a scan trigger 704 to the wireless module 110, which performs a wireless scan 706 to obtain the wireless data 118 which indicates a wireless signature for a surrounding wireless signal environment. The wireless data 118, for instance, includes information about nearby network connectivity devices 120, such as BSSIDs, RSSI, wireless frequency, and so forth. Accordingly, the wireless module 110 communicates scan results 708 that include the wireless data 118 (including wireless cellular data) to the sensor system 108, and the sensor system 108 provides the scan results 708 as scan data 710 to the output module 206.

The output module 206 processes the scan data 710 using the derivative POI data 610. The output module 206, for instance, compares the scan data 710 to the pillar signatures 624 to determine if the scan data 710 matches a pillar location identified in the pillar profiles 622. When the output module 206 determines that the scan data 710 matches a particular pillar signature 624, the output module 206 outputs a pillar entry event 712 that indicates that the mobile device 102 is detected at a pillar location, and includes a pillar ID 626 for the detected pillar location. Generally, the pillar entry event 712 can be utilized by various functionalities of the mobile device 102 and for different purposes. For instance, the mobile device 102 can detect the pillar entry event 712, and perform an action such as unlocking the mobile device 102 from a locked state. Alternatively or in addition, various other types of actions may be performed in response to the pillar entry event 712. Further, different pillar locations may be associated with different events and permissions such that some actions in relation to the mobile device 102 are allowed or disallowed in particular pillars locations.

As part of generating the pillar entry event 712, the output module 206 also generates confidence data 714 that indicates a relative confidence that the mobile device 102 is present at the pillar location. Generally, differences in detected motion of the mobile device 102 can result in different confidence values. As previously discussed, different pillar types can be defined, such as stationary pillars and variable pillars. Thus, since stationary pillars are typically associated with little or no motion of the mobile device 102 during pillar detection, detection of a stationary pillar may be associated with a high confidence value. However, detection of a variable pillar typically include some motion of the mobile device 102, and thus may be associated with a low confidence value in comparison with that of a stationary pillar.

Figure 8:
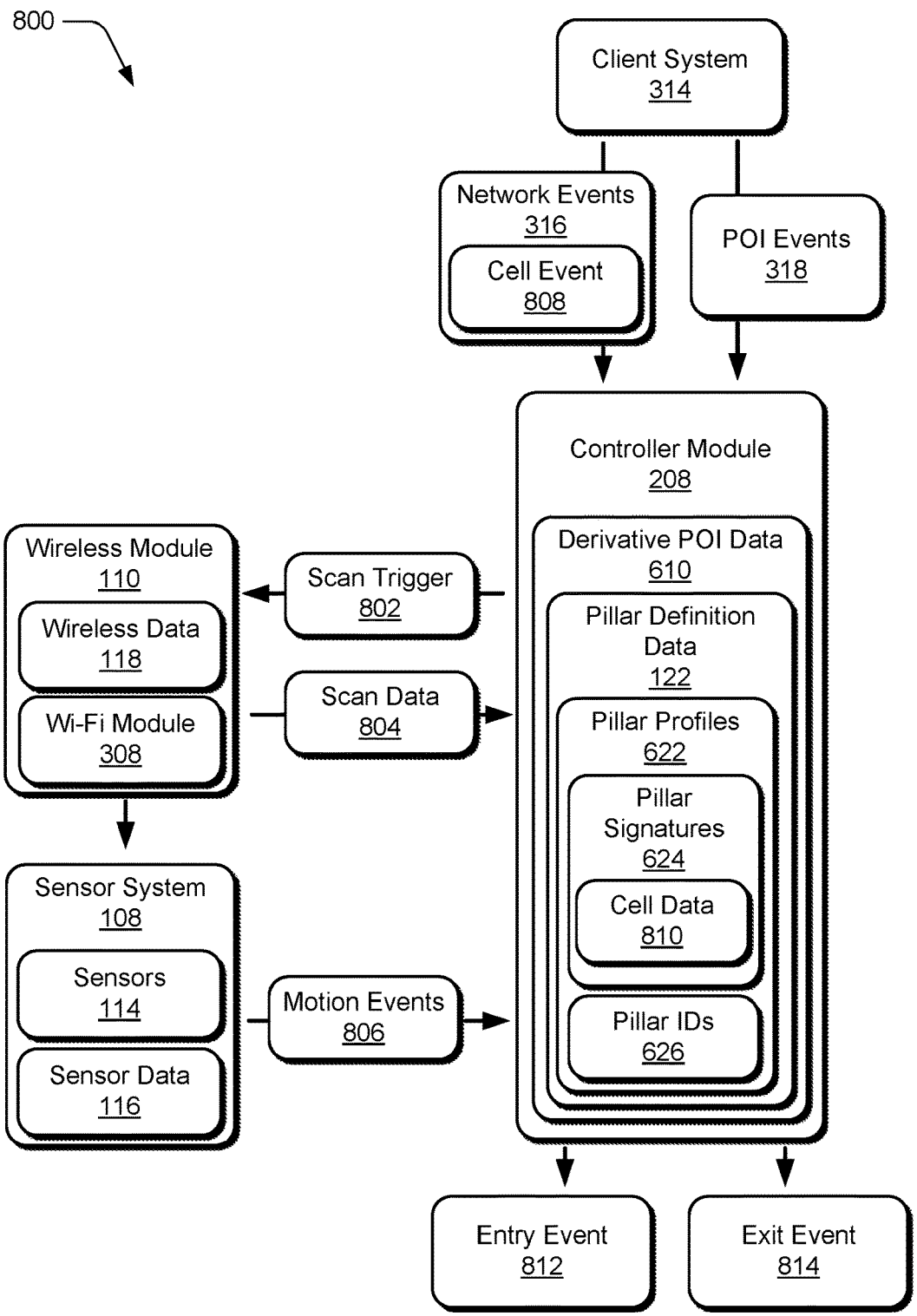
FIG. 8 depicts a system showing example operation of a controller module in accordance with one or more implementations described herein.

FIG. 8 depicts a system 800 showing example operation of the controller module 208. Generally, the controller module 208 represents functionality to control transitions between different functionalities and tasks of the pillar management module 112 based on POI entry and exit events. For instance, the controller module 208 controls initiation and termination of the learning process of the learning module 204 and the output process of the output module 206.

To enable the controller module 208 to control different tasks performed by the pillar management module 112, the controller module 208 takes different types of data as inputs. For instance, the controller module 208 receives the derivative POI data 610 generated by the learning module 204. Further, the controller module 208 receives network events 316 and POI events 318 from the client system 314. To enable the controller module 208 to obtain data about wireless environments surrounding the mobile device 102, the learning module 204 communicates a scan trigger 802 to the wireless module 110, which performs a wireless scan and returns scan data 804. Further, the sensor system 108 communicates motion events 806 to the controller module 208, such as indications of whether the mobile device 102 is in motion, and/or if the mobile device 102 has not moved or has moved very little over a particular period of time.

In operation, the controller module 208 utilizes various types of information to determine POI entry and exit events, and to control different portions of the pillar management module 112 based on these events. For instance, consider that the client system 314, as part of providing the network events 316 to the controller module 208, provides wireless cellular ("cell") events 808 to the controller module 208 indicating proximity and/or connectivity of the mobile device 102 to a cell of a wireless cellular network. A cell event 808, for instance, includes an identifier for a particular cell of a wireless cellular network, such as based on an identifier transmitted by a base station that transmits and receives wireless signal for the cell.

Further, consider that the pillar signatures 624 in the derivative POI data 610 include cell data 810 identifying wireless cellular networks that are detectable at respective pillar locations. For instance, cell data 810 for a particular pillar signature 624 identifies a wireless cellular network and/or base station that was previously detected and/or connected to by the mobile device 102 when present at a respective pillar location. Accordingly, when the controller module 208 receives a cell event 808, the controller module 208 can match a cell network for a particular pillar profile 622 based on the cell data 810 to a cell network identified in the cell event 808. If the cell network identified in the cell event 808 matches a cell network for a pillar profile 622, the controller module 208 can initiate further actions.

For instance, in response to detecting a wireless cellular network associated with a pillar profile 622, the controller module 208 communicates the scan trigger 802 to the wireless module 110 instructing the wireless module 110 to increase its rate of Wi-Fi scanning. Accordingly, the wireless module 110 increases its wireless scanning rate and generates the scan data 804 that includes wireless signature information for a wireless environment surrounding the mobile device 102, such as BSSIDs for detected network connectivity devices 120, RSSI for detected wireless signal, and so forth. The wireless module 110 communicates the scan data 804 to the controller module 208, and the controller module 208 compares the scan data 804 to the pillar signatures 624 in the pillar profiles 622. If the controller module 208 determines that the scan data 804 matches a pillar signature 624, the controller module 208 generates a POI entry event 812 indicating that the mobile device 102 has entered a previously-identified POI. As mentioned previously, the pillar signature 624 can include wireless information previously identified for a POI, such as BSSIDs for network connectivity devices 120 detected at a POI. In at least one implementation, the pillar signature 624 can include identifiers (e.g., BSSIDs) for devices that the mobile device 102 may not have previously connected to, such as a wireless peripheral within a POI. For instance, consider that a wireless peripheral (e.g., a wireless printer) is in the same room as an AP. The learning module 204 detects both the wireless peripheral and the AP as POI BSSIDs by virtue of strong signal cross correlation between wireless signals of the wireless peripheral and the AP. Accordingly, subsequently detecting the wireless peripheral in the scan data 804 would trigger a POI entry event. As further detailed below, various actions can be performed in response to the POI entry event 812, such as triggering the learning module 204 and/or the output module 206 to perform different actions.

In at least some implementations, when the wireless module is outside of a POI, the wireless module 110 can be maintained in a dormant state and/or a low power state where it infrequently performs wireless scans. However, as mentioned above, when the controller module 208 detects a cellular network associated with a known pillar location, the controller module 208 signals the wireless module 110 to increase its rate of wireless scans, which may include a wake event to wake the wireless module 110 from a sleep state. Generally, this allows for conservation of system resources (e.g., battery power, processor, and so forth) when the mobile device 102 is likely outside of POI.

The controller module 208 is also configured to generate a POI exit event 814 indicating that the mobile device 102 exits a POI. For instance, consider the scenario above where the controller module 208 compares the scan data 804 to the pillar signatures 624 in the pillar profiles 622. If the controller module 208 determines that the scan data 804 does not match any pillar signature 624 (e.g., no POI BSSIDs are detected), the controller module 208 generates the POI exit event 814 indicating that the mobile device 102 has exited a POI. In at least one implementation, in response to the POI exit event 814, the controller module 208 instructs the wireless module 110 to decrease its scan rate, and/or to enter a dormant mode.

Figure 9A:
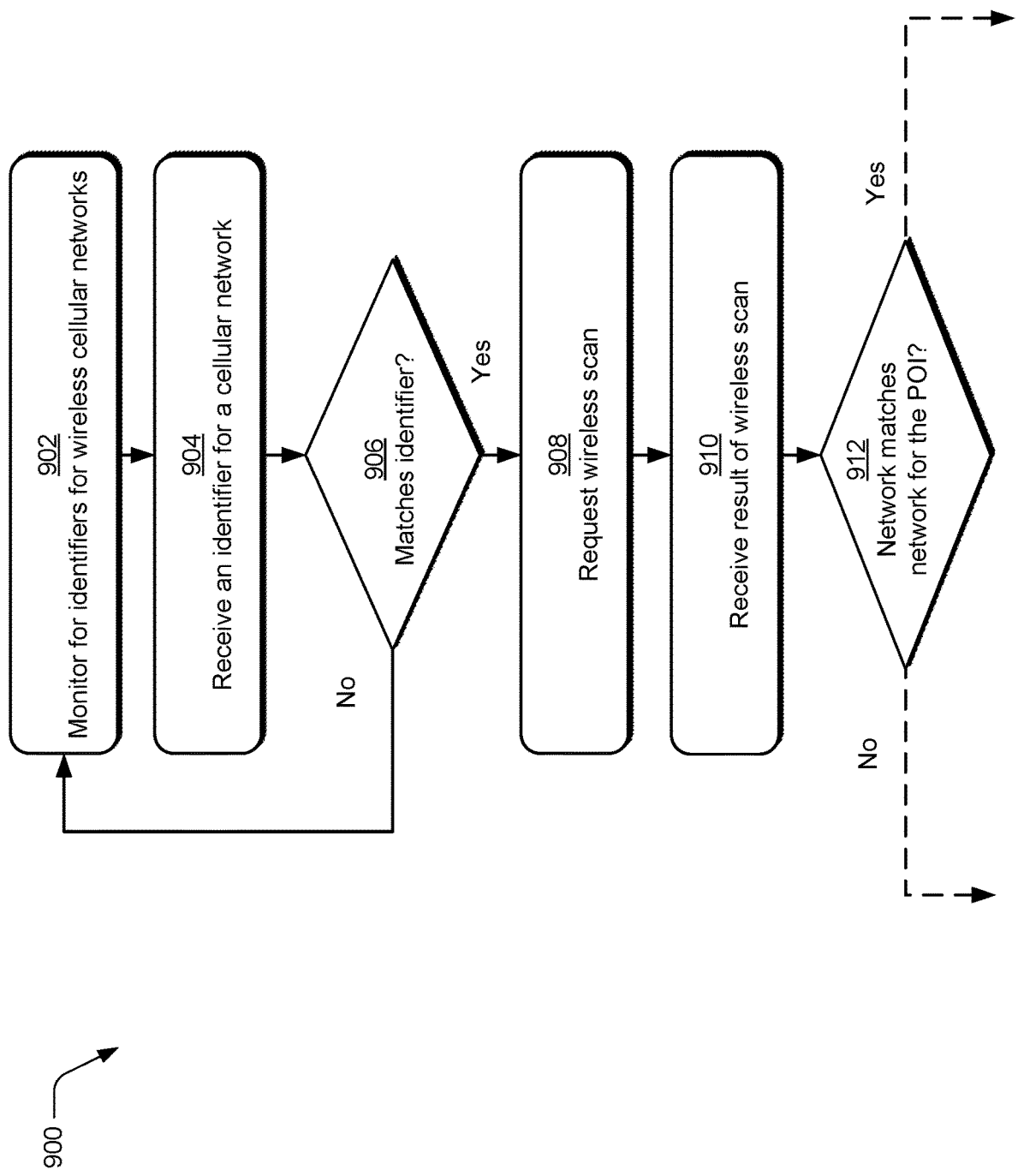
FIG. 9a depicts a portion of a method showing example operations for controlling different portions of the systems described herein in accordance with one or more implementations described herein.

FIG. 9a depicts a portion of a method 900 showing example operations for controlling different portions of the systems described herein for pillar location for a mobile device, such as via operations of the controller module 208.

At 902, a process monitors for identifiers for wireless cellular networks. For example, the controller module 208 monitors for information regarding a wireless cellular network, such as from the client system 314.

At 904, an identifier for a cellular network is received. The controller module 208, for instance, receives an identifier of a cell of a wireless cellular network. In at least one implementation, the identifier is received from a system functionality, such as the client system 314 of the mobile device 102. For example, the client system 314 communicates the identifier to the controller module 208 in response to a particular event, such as the mobile device 102 detecting and/or connecting to a new cell of a cellular network, the mobile device leaving and/or disconnecting from a cell of a cellular network, and so forth.

At 906, a determination is made whether the received identifier matches a known identifier for a cellular network known to be associated with a point of interest (POI). For example, the controller module 208 compares the received identifier with cell data 810. If the received identifier does not match a known identifier ("No"), the method returns to 902.

If the received identifier matches a known identifier ("Yes"), at 908 a wireless scan is requested. The controller module 208, for example, notifies the wireless module 110 to wake and/or increase its rate of wireless scans. At 910, a scan result of the wireless scan is received. For instance, the wireless module 110 performs a wireless scan (e.g., for Wi-Fi signal), gathers a wireless signature for a surrounding wireless environment, and returns a result of the scan to the controller module 208

At 912, at determination is made whether a wireless network identified in the wireless scan matches a known wireless network for the POI. For instance, the controller module 208 compares wireless network information from the scan results with pillar signatures 624 from the derivative POI data 610 to determine if there are any matching wireless networks. In at least one example, the comparison includes comparing BSSIDs from the scan results to BSSIDs from the pillar signatures 624 (e.g., POI BSSIDs) to determine if there are any matching BSSIDs. The method continues in the discussion of FIG. 9b.

Figure 9B:
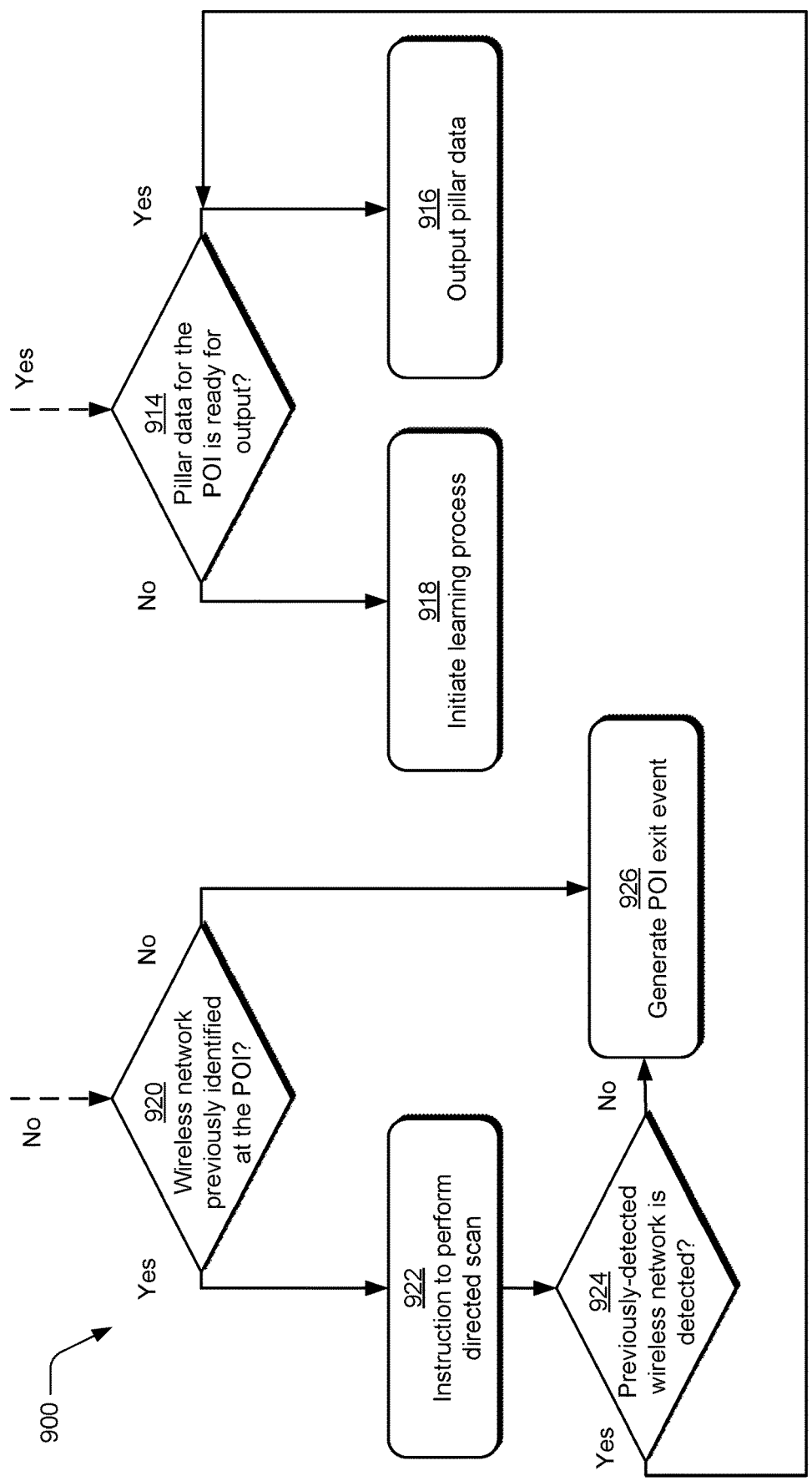
FIG. 9b depicts a portion of a method showing example operations for controlling different portions of the systems described herein in accordance with one or more implementations described herein.

FIG. 9b depicts a further portion of the method 900. Based on the determination from 912, if a wireless network identified in the wireless scan matches a known wireless network for the POI ("Yes"), at 914 a determination is made whether pillar data for the POI is ready for output. Generally, this determination can be based, at least in part, on a state of the learning module 204. For instance, the controller module 208 can specify learning criteria which indicate when the output module 206 may start outputting pillar information generating by the learning module 204, such as outputting the pillar definition data 122 and outputting pillar entry and exit events. The learning criteria, for instance, can be based on a duration of time that the learning module 204 has been generating the derivative POI data 610, and/or an elapsed time since a new pillar location has been identified. For example, the learning criteria may specify that after a week of generating the derivative POI data 610, the output module 206 may start outputting pillar information. Alternatively or in addition, the learning criteria may specify that if n days elapse without identifying a new pillar location from the derivative POI data 610, the output module 206 may start outputting pillar location information.

If pillar data for the POI is ready for output ("Yes"), at 916 pillar data for a pillar within the POI is output. For instance, in response to determining that a learning criterion for outputting pillar data is satisfied, the controller module 208 instructs the output module 206 to output pillar data for the POI. Generally, outputting the pillar data may take various forms, such as generating a pillar entry event 812 indicating that the mobile device 102 is present at a particular pillar location identified by a pillar profile 622.

If pillar data for the POI is not ready for output ("No"), at 918 a learning process for a pillar location within the POI is initiated. For instance, in response to determining that a learning criteria for outputting pillar data is not satisfied, the controller module 208 instructs the learning module 204 to perform processing of data gathered at the POI. In response to prompting from the controller module 208, for example, the learning module 204 processes marked collection data 212 gathered at the POI to generate derivative POI data 610 for the POI. Example ways in which the learning module 204 performs such processing are detailed elsewhere, such as above with reference to FIG. 6. According to one or more implementations, the process can return to 902 from either 916 or 918.

Returning to 912, if a wireless network identified in the wireless scan does match not a known wireless network for the POI ("No"), at 920 a determination is made whether a wireless network was previously identified at the POI. For instance, the controller module 208 determines whether a wireless network is identified in the derivative POI data 610 as having been previously detected via a network scan at the POI, such as in a specified number of previous wireless scans. If a wireless network was previously identified ("Yes"), at 922 an instruction issued to perform a directed scan for the wireless network. The controller module 208, for example, instructs the wireless module 110 to perform a directed scan for the previously-detected wireless network. The directed scan, for instance, is not a general broadcast scan for any wireless network at the POI, but represents a scan for a specific instance of a network, such as based on a known wireless frequency and/or BSSID for a network connectivity device 120 of the network.

At 924, a determination is made whether the previously-detected wireless network is detected in the directed wireless scan. If the previously-detected wireless network is detected in the directed wireless scan ("Yes"), the method proceeds to 914. If the previously-detected wireless network is not detected in the directed wireless scan ("No"), at 926 a POI exit event is generated. The controller module 208, for example, determines that the mobile device 102 has exited the POI since a wireless network previously-detected at the POI is no longer detectable. In at least one implementation, based on the POI exit event, the controller module 208 can cause the learning module 204 and/or the output module 206 to stop processing. Returning to 920, if a wireless network was not previously identified at the POI ("No"), the method proceeds to 926.

Accordingly, the method 900 presents example ways in which different aspects of pillar location for a mobile device can be controlled.

Figure 10:
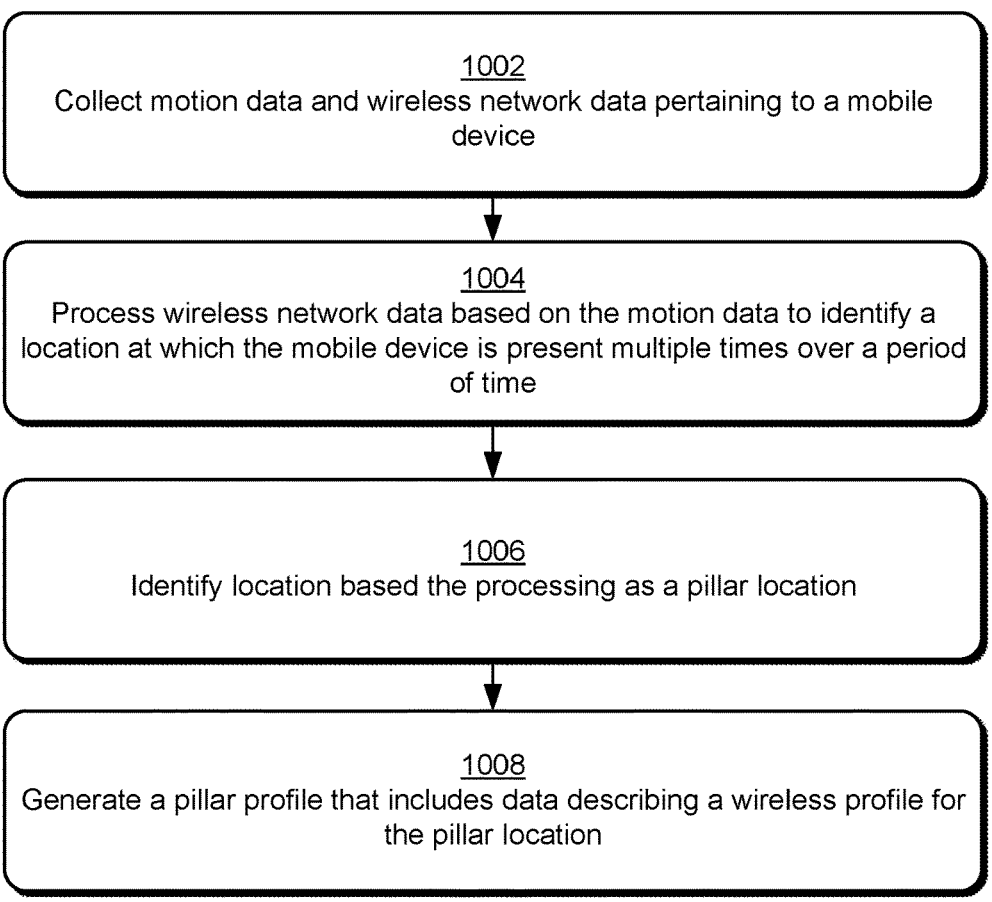
FIG. 10 depicts a method for detecting a pillar location and generating a pillar profile in accordance with one or more implementations described herein.

FIG. 10 depicts a method 1000 for detecting a pillar location and generating a pillar profile. At 1002, motion data and wireless network data pertaining to a mobile device are collected. The collection module 202, for instance, receives motion data from the sensor system 108, and wires network data from the wireless module 110. Generally, the data is collected at multiple different locations where the mobile device 102 is present, and the motion data indicates a relative amount of motion of the mobile device 102 at the multiple different locations. In at least one implementation, collection of the data is initiated in response to an indication that the mobile device 102 is in proximity to a pre-defined POI, such as based on a notification from the client system 314.

At 1004, the wireless network data is processed based on the motion data to identify a location at which the mobile device is present multiple times over a period of time. The learning module 204, for instance, utilizes data collected by the collection module 202 to generate derivative POI data 610 indicating a particular location where the mobile device 102 is stationary and/or exhibits little motion for a particular period of time, such as a threshold duration of time. Further, the derivative POI data 610 indicates a common wireless signature at the location, such as based on identities of network connectivity devices 120 and RSSI detected at the location.

At 1006, the location is identified based on the processing as a pillar location. In at least one implementation, the controller module 208 determines that a learning criteria for the learning module 204 is met, and thus that the output module 206 may output pillar definition data 122 for the location. As discussed with reference to the method 900, for instance, the learning criteria may be based on a duration of time that the learning module 204 has been generating the derivative POI data 610 (e.g., a defined learning period), and/or an elapsed time since a new pillar location has been identified.

At 1008, a pillar profile is generated that includes data describing a wireless profile for the pillar location. The learning module 206, for instance, generates a pillar profile 622 that defines various attributes of the pillar location, such as a wireless signature of the pillar location, a pillar ID 626 that identifies the pillar location, various permissions associated with the pillar location, and so forth. As further detailed herein, the pillar profile may be used for various purposes, such as to detect pillar location entry and exit events, and for performing different tasks in response to the pillar location entry and exit events. For example, consider the discussion of the following method.

Figure 11:
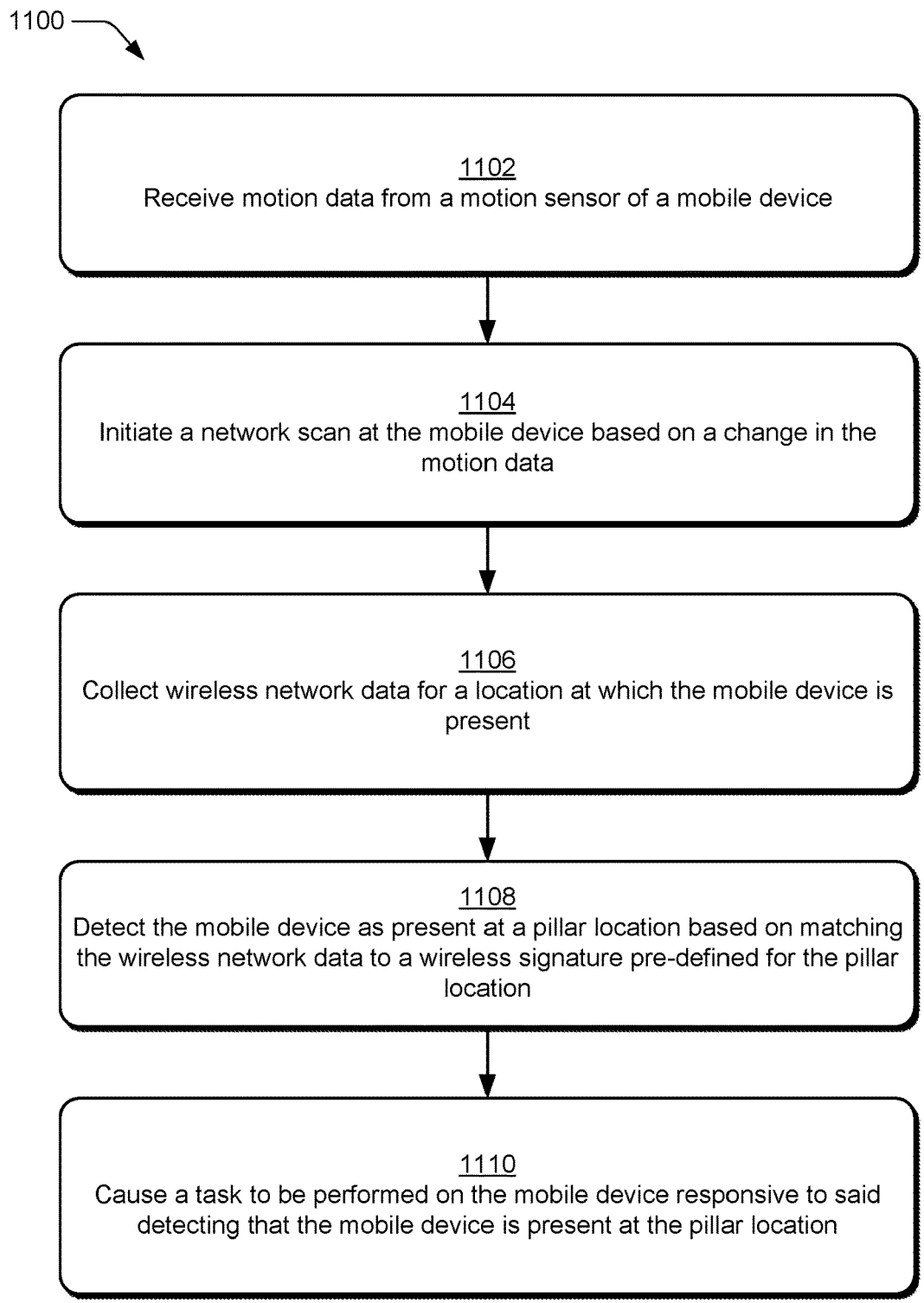
FIG. 11 depicts a method for performing actions based on device presence in a pillar location in accordance with one or more implementations described herein.

FIG. 11 depicts a method 1100 for performing actions based on device presence in a pillar location. In at least some implementations, the method is performed after pillar profiles have been generated defining different pillar locations. At 1102, motion data is received from a motion sensor of a mobile device. The pillar management module 112, for instance, receives motion data from the sensor system 108 describing relative motion of the mobile device 102.

At 1104, a network scan is initiated at the mobile device based on a change in the motion data. For example, the pillar management module 112 determines that the motion data indicates that the mobile device 102 has reduced motion, such as indicating that the mobile device 102 has become stationary. Accordingly, based on the change in device motion, the pillar management module 112 instructs the wireless module 110 to initiate wireless scanning and/or to increase its wireless scan rate.

At 1106, wireless network data is collected for a location at which the mobile device is present. Based on the network scan, for instance, the pillar management module 112 receives wireless network data for a location surrounding the mobile device 102, such as a wireless signature for the location that describes a surrounding wireless signal environment.

At 1108, the mobile device is detected as present at a pillar location based on matching the wireless network data to a wireless signature pre-defined for the pillar location. For example, based on determining that the collected wireless network data matches a pillar signature 624 for a pillar profile 622, the pillar management module 112 determines that the mobile device 102 is present at a pillar location.

At 1110, a task is caused to be performed on the mobile device responsive to said detecting that the mobile device is present at the pillar location. Generally, different tasks can be performed based on detecting that the mobile device 102 enters a pillar location, such as transitioning the mobile device 102 from a locked state to an unlocked state, authenticating a user on the mobile device 102, providing access to secure content via the mobile device 102, and so forth.

In addition to detecting pillar location entry events, pillar location exit events may also be detected and tasks performed based on the exit events. For instance, consider the following method.

Figure 12:
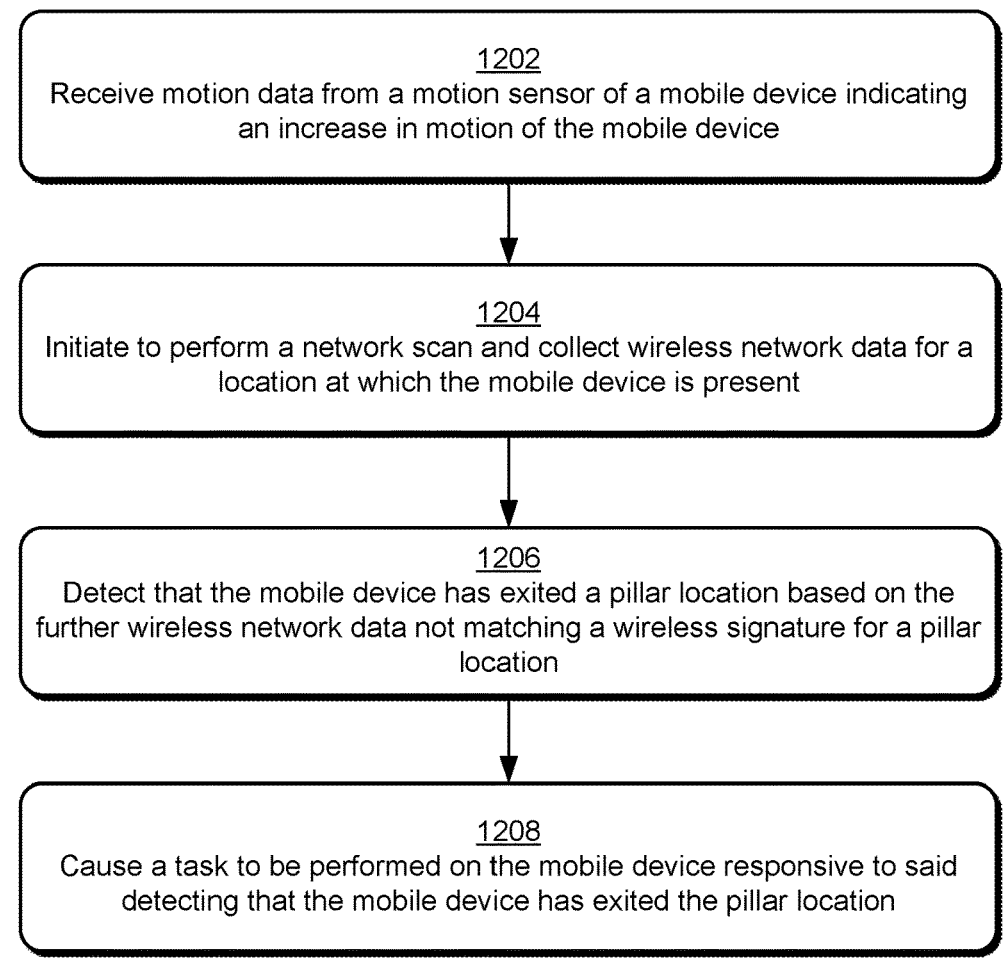
FIG. 12 depicts a method for performing actions based on a device leaving a pillar location in accordance with one or more implementations described herein.

FIG. 12 depicts a method 1200 for performing actions based on a device leaving a pillar location. In at least some implementations, the method is performed after pillar profiles have been generated defining different pillar locations, and after a device has been detected as entering a pillar location.

At 1202, motion data is received from a motion sensor of a mobile device indicating an increase in motion of the mobile device. For instance, after the mobile device 102 is detected as being present in a pillar location, the pillar management module 112 receives motion data from the sensor system 108 indicating an increase in device motion.

At 1204, the mobile device initiates to perform a network scan and collect wireless network data for a location at which the mobile device is present. Based on the increase in motion of the mobile device 102, for example, the pillar management module 112 instructs the wireless module 110 to perform a wireless scan for wireless data at a current location of the mobile device 102. The pillar management module 112 then receives wireless network data from the wireless module 110 that describes a wireless signal environment surrounding the mobile device 102.

At 1206, it is detected that the mobile device has exited the pillar location based on the further wireless network data not matching a wireless signature for a pillar location. The pillar management module 112, for example, compares the wireless network data from the wireless scan to the pillar signatures 624 and determines that the wireless network data does not match a pillar profile 622. In a scenario where the mobile device 102 was previously detected as present at a pillar location, this indicates that the mobile device 102 has exited the pillar location. Thus, a pillar exit event can be generated.

At 1208, a task is caused to be performed on the mobile device responsive to said detecting that the mobile device has exited the pillar location. Generally, different tasks can be performed based on detecting that the mobile device 102 exits a pillar location, such as transitioning the mobile device 102 from an unlocked state to a locked state, de-authenticating (e.g., logging out) a user on the mobile device 102, restricting access to secure content via the mobile device 102, and so forth.

Thus, implementations of pillar location for a mobile device provide ways for defining fine-tuned pillar locations while conserving devices resources, such as battery power, processor bandwidth, wireless radio, and so forth.

Figure 13:
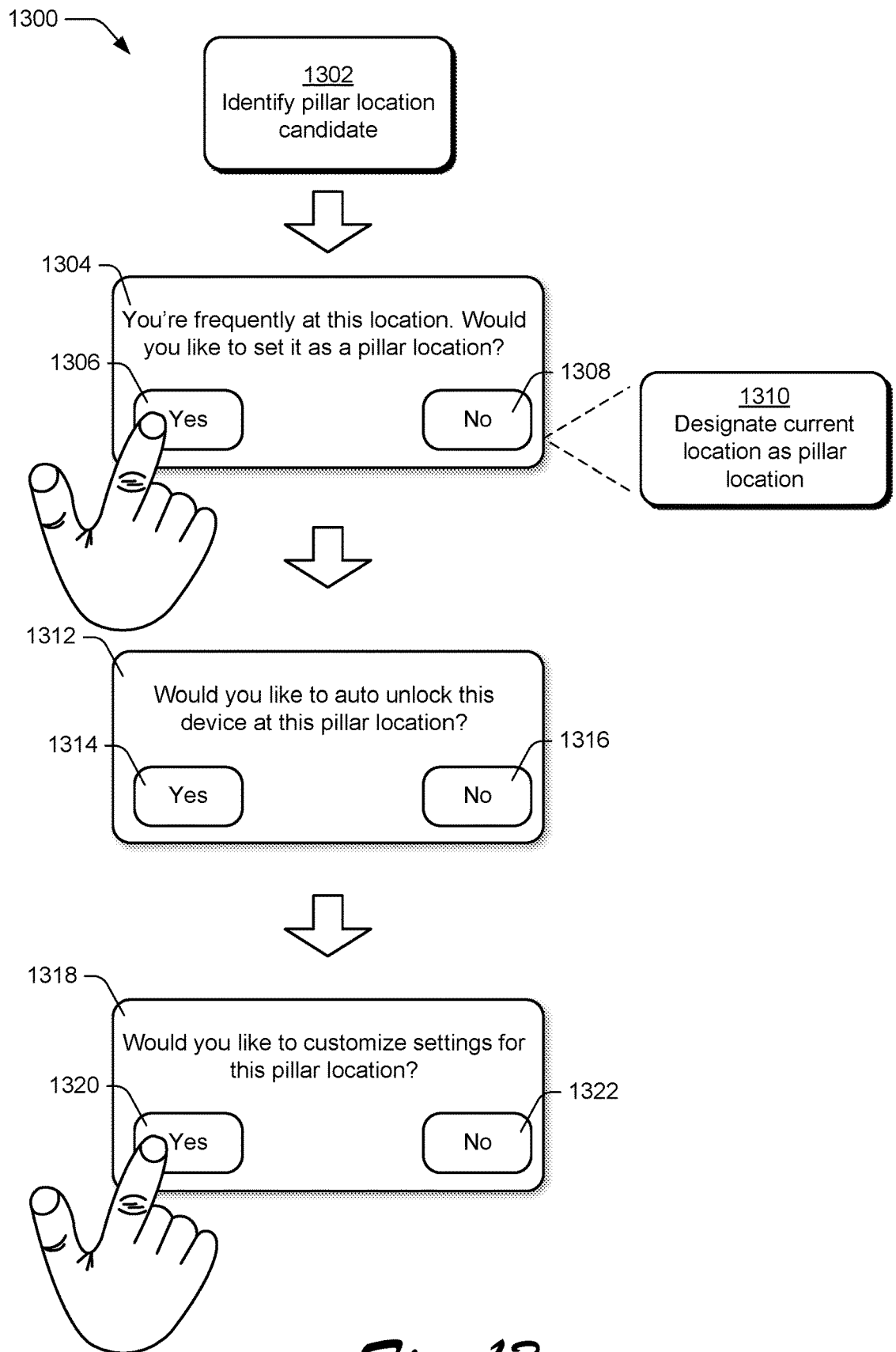
FIG. 13 depicts an implementation scenario for user verification of a pillar location in accordance with one or more implementations described herein.

FIG. 13 depicts an implementation scenario 1300 for user verification of a pillar location. In at least one implementation, the scenario 1300 can be implemented in conjunction with the techniques and procedures described above, such as part of the method 1200.

At 1302, a location is identified as a pillar candidate location. Utilizing the techniques described above, for instance, the pillar management module 112 determines that a particular geographic location meets a learning criteria for a pillar location, such as generated by the learning module 204. Accordingly, the pillar management module 112 generates and outputs a pillar prompt 1304 for display on a display device of the mobile device 102. Generally, the pillar prompt 1304 queries whether a user would like to set a current location of the mobile device 102 as a pillar location. The pillar prompt 1304 includes a confirm control 1306 that is selectable to verify the current location as a pillar location, and a decline control 1308 that is selectable to decline to set the current location as a pillar location.

Accordingly, a user selects the confirm control 1306, which causes the pillar management module 112 to perform an action 1310 designating the current location of the mobile device 102 as a pillar location. For instance, as described above, the pillar management module 112 generates a pillar profile 622 for the current location that includes various attributes for the current location, such as a pillar signature 624 and a pillar ID 626 for the current location.

Further to the scenario 1300, and in response to designating the location as a pillar location, the pillar management module 112 generates and outputs an unlock prompt 1312 that queries whether the user would like to cause the mobile device 102 to automatically unlock at the pillar location. The unlock prompt 1312 includes an accept control 1314 that is selectable to cause the mobile device 102 to automatically unlock when the mobile device 102 is determined to be located at the pillar location, and a decline control 1316 that is selectable to prevent setting the mobile device 102 to automatically unlock at the pillar location. For instance, in response to selection of the accept control 314, the pillar management module 112 instructs the client system 314 to automatically unlock the mobile device 102 when the mobile device 102 is detected to be present at the pillar location. In at least one implementation, the pillar management module 112 updates a pillar profile for the pillar location to indicate that the mobile device 102 is to automatically unlock at the pillar location.

Continuing with the scenario 1300, the pillar management module 112 generates and outputs a customize prompt 1318 which queries whether the user would like to customize settings for the designated pillar location. The customize prompt 1318 includes an accept control 1320 that is selectable to initiate a customization process for customizing the pillar location, and a decline control 1322 that is selectable to decline initiating the customization process. In this particular implementation, the user selects the accept control 1320, which initiates the customization process, as further detailed below.

Figure 14:
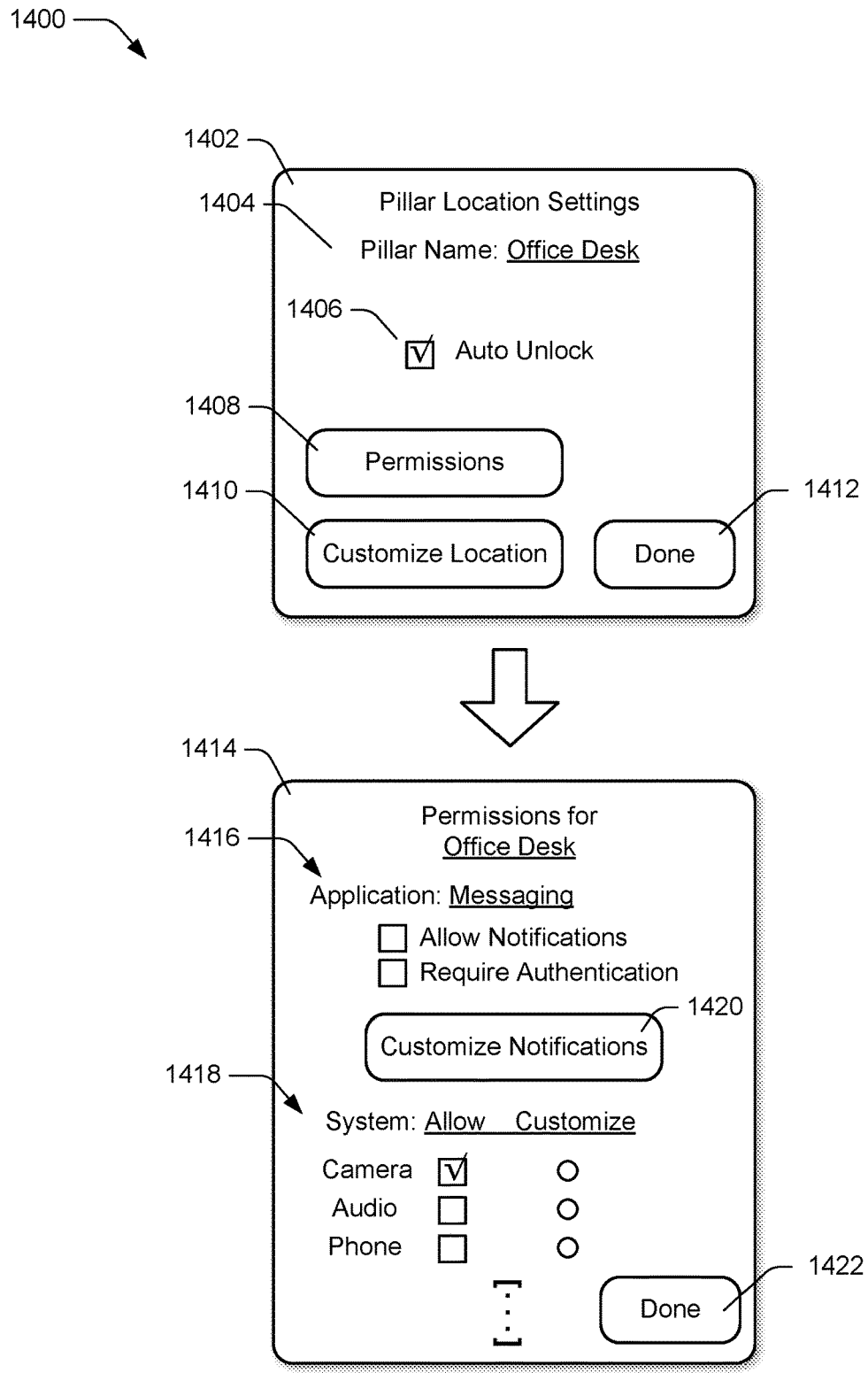
FIG. 14 depicts a scenario for implementing a customization process for customizing attributes of a pillar location in accordance with one or more implementations described herein.

FIG. 14 depicts a scenario 1400 for implementing a customization process for customizing attributes of a pillar location. The scenario 1400, for example, is implemented in response to selection of the accept control 1320 from the customize prompt 1318, discussed above.

In the scenario 1400, the pillar management module 112 generates and outputs a pillar settings user interface (IU) 1402, such as in response to selection of the accept control 1402 from the customize prompt 1318. Generally, the pillar settings UI 1402 includes various interface affordances to enable different attributes of a pillar location to be customized. For instance, the pillar settings UI 1402 includes a name field 1404 and an auto unlock field 1406. The name field 1404 represents a fillable field that is configured to receive user input designating a name for the pillar location. The auto unlock field 1406 represents a selectable field that is selectable to enable and disable auto unlocking at the pillar location.

The pillar settings UI 1402 further includes a permissions control 1408, a customize location control 1410, and a done control 1412. The permissions control 1408 is selectable to cause the pillar management module 112 to implement a permissions setting process for setting various permissions for the pillar location. Examples of different aspects of a permissions setting process are discussed below. Further, the customize location control 1410 is selectable to implement a pillar location customization process, example attributes of which are discussed below. The done control 1412 is selectable to finish a customization process. For instance, selecting the done control 1412 causes any settings input to the pillar settings UI 1402 to be applied, and the pillar settings UI 1402 to be torn down.

Further to the scenario 1400, and in response to selection of the permissions control 1408, the pillar management module 112 generates and outputs a permissions UI 1414 that enables different permissions for the pillar location to be configured. For instance, the permissions UI 1414 includes an application permissions field 1416 and a system permissions field 1418. The application permissions field 1416 lists different applications that are executable on the mobile device 102, and enables different operational aspects of the applications to be customized for the pillar location. For instance, the application permissions field 1416 enables notifications from a particular application to be enabled and disabled at the pillar location. Further, the application permissions field 1416 enables a user to specify whether user authentication is required for an application to be launched and/or enabled at the pillar location. A customize notifications control 1420 is also included in the application permissions field 1416 that is selectable to initiate a process for customizing how notifications are presented from an application. For instance, selecting the customize notifications control 1420 enables notification types to be specified (e.g., audio, visible, tactile), and notification parameters to be set, such as volume, duration, and visualization type.

The system permissions field 1418 enables permissions for various system functionalities (e.g., hardware and processes) to be configured. For instance, the system permissions field 1418 enables different system functionalities to be enabled or disabled at the pillar location, and permissions for the system functionalities to be customized at the pillar location. The permissions UI 1414 further includes a done control 1422 that is selectable to apply permissions settings specified in the permissions UI 1414, and to tear down the permissions UI 1414.

Figure 15:
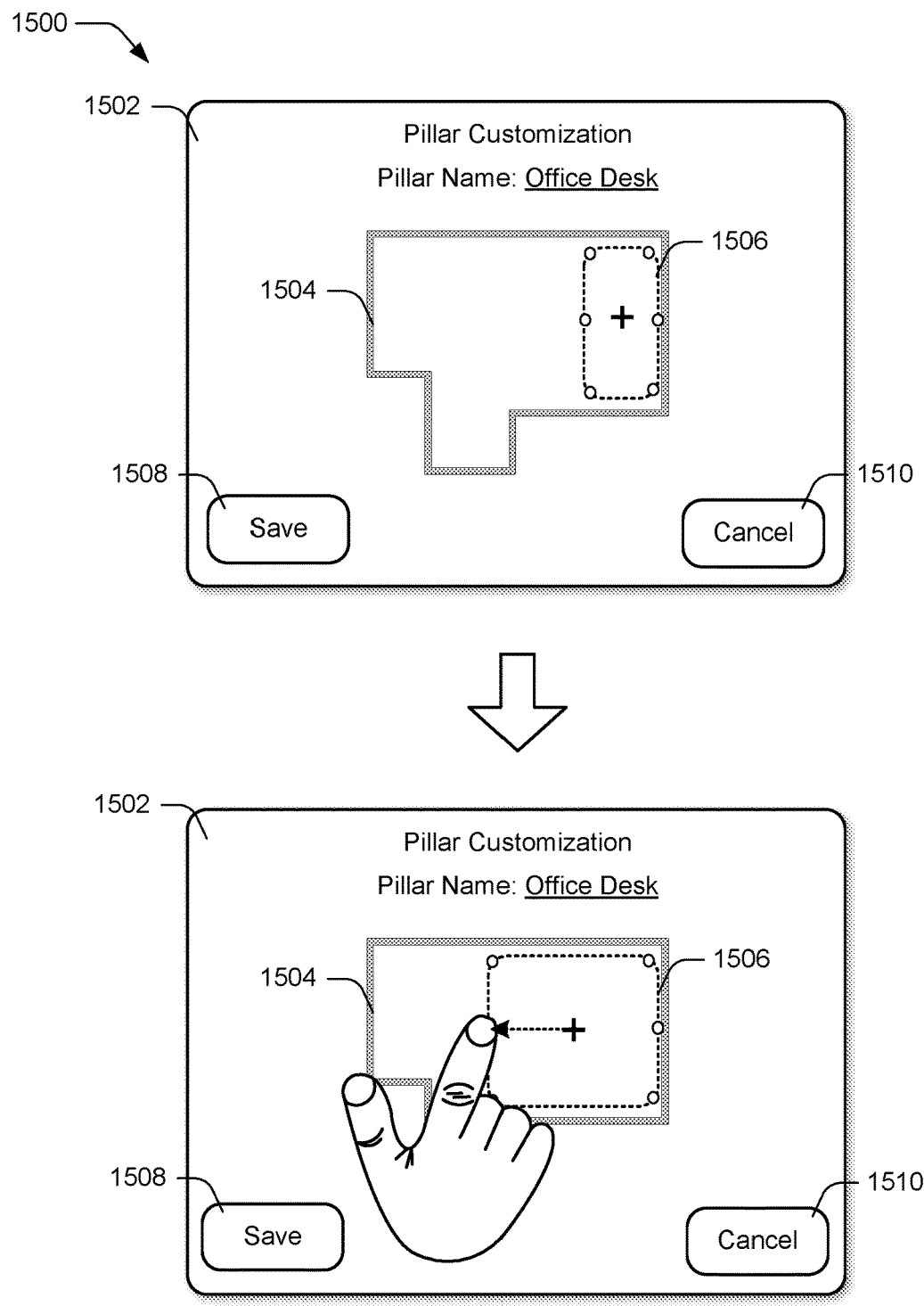
FIG. 15 depicts a scenario for implementing a location customization process for customizing configuration of a pillar location in accordance with one or more implementations described herein.

FIG. 15 depicts a scenario 1500 for implementing a location customization process for customizing configuration of a pillar location. The scenario 1500, for example, is implemented in response to selection of the customize location control 1410 from the pillar settings UI 1402, discussed above.

In the scenario 1500, the pillar management module 112 generates and outputs a location customization UI 1502 that enables a size and/or position of the pillar location to be customized by a user. In this particular example, the location customization UI 1502 includes a POI visual 1504 and a pillar location visual ("pillar visual") 1506. Generally, the POI visual 1504 can be generated in various ways. For instance, a pre-generated map of a POI can be loaded by the mobile device 102, and portions of the map can be displayed as the POI visual 1504. Alternatively or additionally, attributes of a POI can be detected and learned by the pillar management module 112. For instance, the mobile device 102 can gather various types of position information (e.g., GPS, cellular data, motion data) and can generate the POI visual 1504 based on the position information. The POI visual 1504 may represent various types of POIs, such as a home location, an office location, a classroom, and so forth.

The pillar visual 1506 is a visual representation of a pillar location learned using the various techniques described herein. For instance, the pillar visual 1506 is a visual representation of a perimeter surrounding a learned pillar location output by the pillar management module 112. The pillar visual 1506 includes different interactivity affordances that enable a user to customize a size and position of the pillar location. The pillar visual 1506, for example, includes resizing controls on its perimeter that can receive user input to resize the pillar visual 1506, and thus resize a corresponding pillar location. Further, the pillar visual 1506 includes a handle within the pillar visual 1506 that can receive user input to reposition the pillar visual 1506, and thus the corresponding pillar location. The location customization UI 1502 further includes a save control 1508 that is selectable to save changes made to the pillar visual 1506, and a cancel control 1510 that is selectable to terminate the pillar customization process and tear down the location customization UI 1502.

In the lower portion of the scenario 1500, a user interacts with a resizing control to resize the pillar visual 1506. The user, for instance, provides touch input to the resizing control and drags the resizing control to resize the pillar visual 1506, which in this case involves enlarging a width of the pillar visual 1506. This is not to be construed as limiting, and the pillar visual 1506 can be resized in various ways, such as by increasing or decreasing the size of the pillar visual 1506 and in different directions. To save changes made to the pillar visual 1506, the user can select the save control 1508. For instance, selecting the save control 1508 causes a pillar profile 622 for the pillar location to be updated to reflect the resized pillar visual 1506. A logical boundary of the pillar location, for example, is modified based on the resized pillar visual.

Figure 16:
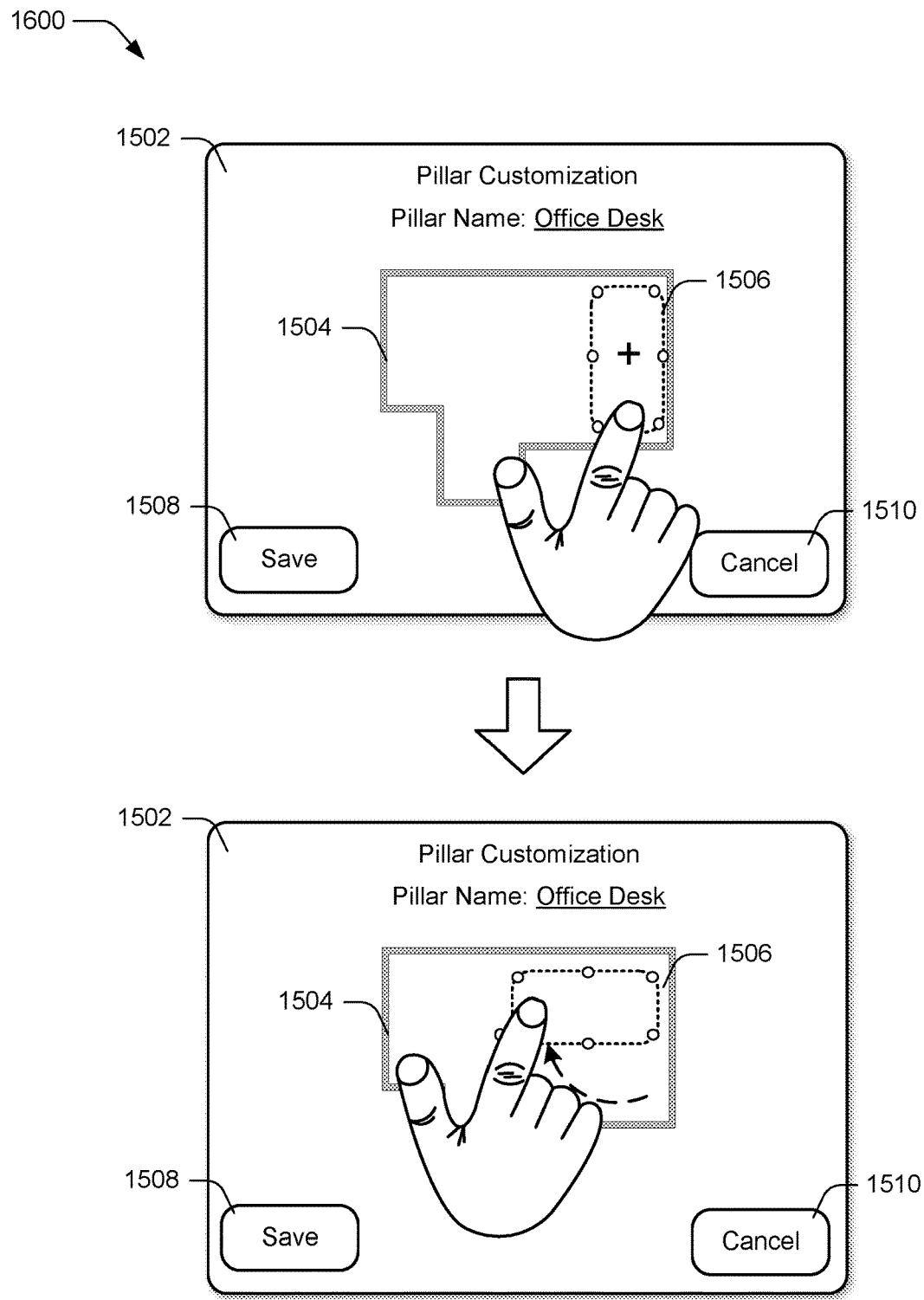
FIG. 16 depicts a scenario for implementing a location customization process for customizing configuration of a pillar location in accordance with one or more implementations described herein.

FIG. 16 depicts a scenario 1600 for implementing a location customization process for customizing configuration of a pillar location. The scenario 1600, for example, is implemented in response to selection of the customize location control 1410 from the pillar settings UI 1402, discussed above. Generally, the scenario 1600 may be implemented additionally or alternatively to the scenario 1500, above.

The upper portion of the scenario 1600 includes the location customization UI 1502, introduced above. Proceeding to the lower portion of the scenario 1600, a user provides input to the pillar visual 1506 to reposition the pillar visual 1506. For instance, the user provides touch input within the pillar visual 1506 and rotates the pillar visual 1506 using a dragging gesture. Thus, the pillar visual 1506 is repositioned relative to the POI visual 1504. To save changes made to the pillar visual 1506 via the repositioning, the user can select the save control 1508. For instance, selecting the save control 1508 causes a pillar profile 622 for the pillar location to be updated to reflect the repositioned pillar visual 1506. A logical boundary of the pillar location, for example, is modified based on the repositioned pillar visual. Accordingly, the pillar visual 1506 may be resized and/or repositioned to customize a size and/or position of a pillar location.

Figure 17:
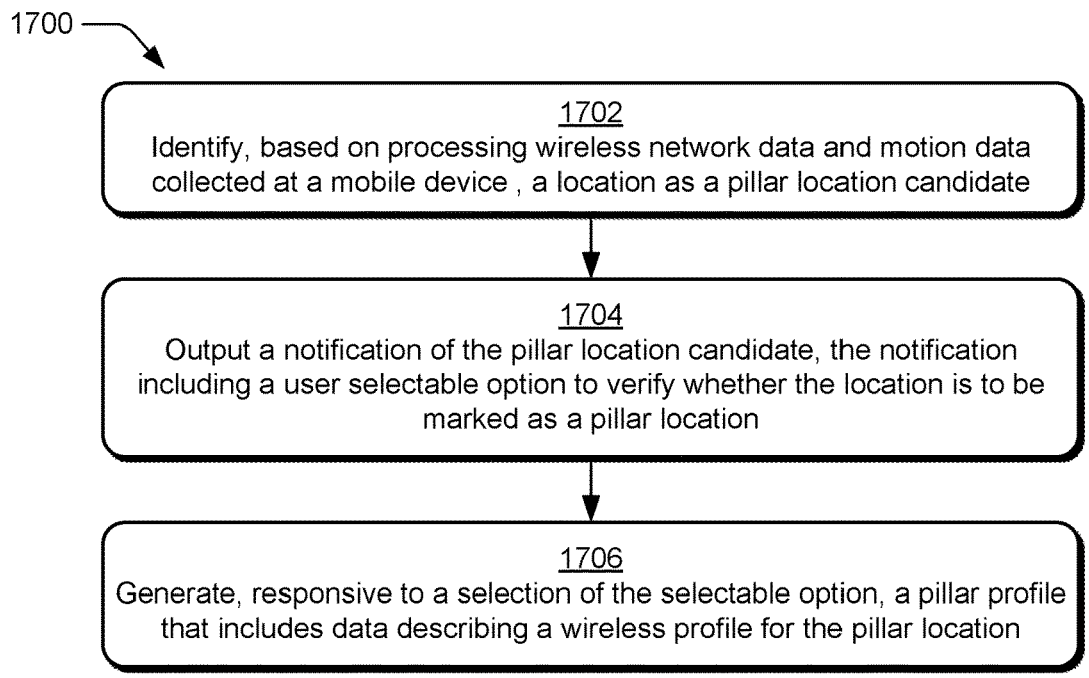
FIG. 17 depicts a method for user verification of a pillar location in accordance with one or more implementations described herein.

FIG. 17 depicts a method 1700 for user verification of a pillar location. In at least some implementations, the method is performed in conjunction with the pillar management module 112 detecting a particular location as a pillar candidate location, such as depicted in the scenario 1300.

At 1702, a pillar location candidate is identified based on processing wireless network data and motion data collected at a mobile device. As detailed in the previous discussion, for example, the pillar management module 112 determines that a learning criteria for a particular location is satisfied. Thus, the pillar management module 112 designates the location as a pillar candidate. Generally, a pillar candidate represents a location that meets the learning criteria for a pillar location, but that is subject to further verification prior to being designated as a pillar location.

At 1704, a notification of the pillar location candidate is output, the notification including a user selectable option to verify whether the location is to be marked as a pillar location. Generally, the notification may be output in various forms, such as a graphical notification and/or an audible notification. One example of such a notification is the pillar prompt 1304 including the confirm control 1306, discussed above.

At 1706, responsive to a selection of the selectable option, a pillar profile is generated that includes data describing a wireless profile for the pillar location. The pillar management module 112, for instance, generates a pillar profile 622 that marks the location as a pillar location. Different attributes of a pillar profile are discussed in detail above.

Figure 18:
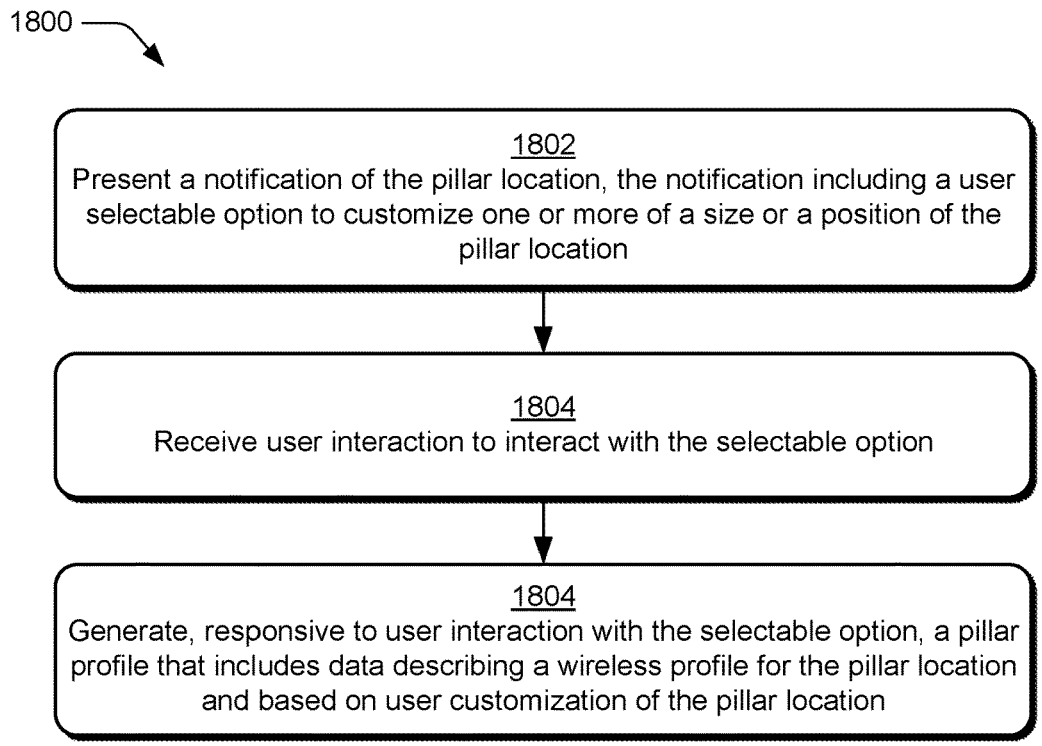
FIG. 18 depicts a method for user customization of a pillar location in accordance with one or more implementations described herein.

FIG. 18 depicts a method 1800 for user customization of a pillar location. In at least some implementations, the method is performed in conjunction with the pillar management module 112 marking a particular location as a pillar location, such as described above.

At 1802, a notification of a pillar location is presented, the notification including a user selectable option to customize one or more of a size or a position of the pillar location. One example of such a notification is the customization UI 1502 with the pillar visual 1506, discussed above. Other types of notifications may additionally or alternatively be provided, such as audible and/or tactile notifications.

At 1804, user interaction is received to interact with the selectable option. For instance, a user interacts with the notification to manipulate a size and/or position of the pillar location.

At 1806, responsive to user interaction with the selectable option, a pillar profile is generated that includes data describing a wireless profile for the pillar location and based on user customization of the pillar location. The pillar management module 112, for example, updates an existing pillar profile 622, or generates a new pillar profile 622 for the pillar location based on the user customization. Updating and/or generating a pillar profile includes updating/generating logical attributes of a pillar profile, such as updating/generating a wireless signature for a pillar location based on a change in size and/or position of the pillar location.

According to various implementations, alternatively or in addition to the various attributes described above, pillar profiles for different pillar locations can be utilized to define various behaviors and actions to be applied at respective pillar locations. For instance, consider the following discussion of example ways for defining attributes and behaviors to be applied at pillar locations.

Figure 19:
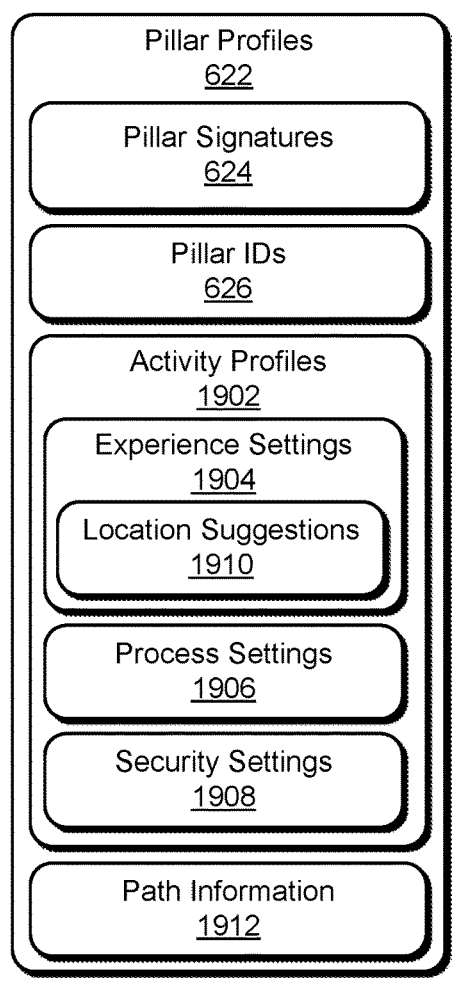
FIG. 19 depicts an example scenario including attributes that can be applied to enhance pillar profiles in accordance with one or more implementations described herein.

FIG. 19 depicts an example scenario 1900 including attributes that can be applied to enhance the pillar profiles 622. As detailed above, the pillar profiles 622 include the pillar signatures 624 and the pillar IDs 626. Additionally, the pillar profiles 622 include activity profiles 1902 that specify various device-related configurations and attributes to be applied at a respective pillar location. Accordingly, the activity profiles 1902 include experience settings 1904, process settings 1906, and security settings 1908. The experience settings 1904 represent settings that can be applied to the mobile device 102 to affect a user experience at different pillar locations. Examples of the experience settings 1904 include notification settings (e.g., notification types and notification levels, such as for ringtones, app notifications, message notifications), app settings (e.g., which apps are allowed to present notifications), screen settings (e.g., brightness), and so forth.

According to various implementations, the experience settings 1904 for a particular pillar location can be generated in different ways. For instance, the experience settings 1904 can be generated based on learned user behaviors applied at different pillar locations. Consider, for example, that a user repeatedly applies a particular group of settings at a particular pillar location over a period of time, e.g., a week. The pillar management module 112 can track this user behavior and can cause the experience settings 1904 to be updated to reflect the group of settings such that the settings are automatically applied to the mobile device 102 when the mobile device 102 is detected as being present at the pillar location. In at least one implementation, the pillar management module 112 can prompt the user for permission to automatically apply the settings, and then apply the settings in response to receiving user permission.

Alternatively or in addition to using learned user behaviors, the experience settings 1904 may be based on predefined experience profiles that can be applied at specific types of locations. For instance, different location types can be defined and associated with different appropriate experience settings, such as "Office," "Conference Room," "Home Living Room," "Home Kitchen," "Home Bedroom," and so forth. Thus, when a particular pillar location is identified as matching one of these location types, experience settings for the profile can be applied to configure the experience settings 1904 for a respective pillar profile 622.

The experience settings 1904 include location suggestions 1910, which are representative of ways for providing user suggestions to customize and/or affect a user experience at different pillar locations. Consider, for example, that the pillar profiles 622 include an indication of media output devices (e.g., for audio and video) that are available at different respective pillar locations. Accordingly, when the mobile device 102 is detected as outputting media at a particular pillar location, the location suggestions 1910 for the particular pillar location can be leveraged to provide a suggestion of an alternative media output device for outputting the media. For instance, a location suggestion 1910 may be output on the mobile device 102 (visually and/or audibly) indicating that a large screen device (e.g., a television) is available for outputting the media, and prompt whether the user would like to cause the media to be output on the large screen device as an alternative or addition to the mobile device 102. If the user accepts the suggestion via input to the mobile device 102, the media can be output on the large screen device. The pillar management module 112, for instance, can initiate a process to cause the media to be output on the large screen device, such as by communicating wirelessly with the large screen device to cause the device to output the media.

The location suggestions 1910 can include various other location-specific suggestions for pillar locations, such as identifiers for contacts detected as being near a pillar location, activities that are scheduled near a pillar location, events of concern that are relevant to a pillar location (e.g., weather and traffic information), and so forth.

In at least one implementation, the location suggestions 1910 can also include advertisements that may be relevant to a particular pillar location. For example, if the user 106 opts to allow advertisements to be presented on the mobile device 102, the pillar management module 112 can serve as an advertisement pipeline between advertisers and the mobile device 102. As mentioned previously, certain pillar locations may be identified as being associated with particular types of locations, such as "Kitchen," "Office," and so forth. Thus, when the mobile device 102 is detected at a particular type of pillar location, location-relevant ads may be served to the mobile device 102. For example, at a pillar location identified as "Kitchen," food and cooking-related ads may be served to the mobile device 102. Generally, this enables users to access location-relevant content that may be helpful based on their current location context, and mitigates the problem of potentially serving non-relevant content to a user.

The process settings 1906 generally represent settings that are applied to affect various processes that execute on the mobile device 102, such as applications, system processes, devices, and so forth. For instance, the process settings 1906 can include settings that affect operation of a processor system of the mobile device 102. Consider, for example, that the pillar management module 112 determines over a period of time that a processor system of the mobile device 102 is less active at a particular pillar location than at other pillar locations. Accordingly, the pillar management module 112 can configure the process settings 1906 to specify that when the mobile device 102 is detected as being present at the particular pillar location, the processor system of the mobile device 102 is to be "turned down." Generally, the processor system may be turned down in various ways, such as by turning off one or more processor cores, reducing power allocation to the processor system, turning down the processing speed of the processor system, and so forth. By turning down the processor system, battery power can be conserved at the particular pillar location.

As another example, the process settings 1906 can be configured to prioritize and/or de-prioritize certain system processes. For instance, consider that the pillar management module 112 determines that the mobile device 102 is typically stationary at a particular pillar location for extended periods of time, such as at night in a bedroom of a user. Accordingly, since the mobile device 102 is typically stationary, the pillar management module 112 can configure the process settings 1906 to de-prioritize location-determination processes at the particular pillar location, such as by allocating less processor system bandwidth to location-determination processes than to other processes at the particular pillar location.

As another example, at a particular pillar location where the mobile device 102 is typically actively using email and/or other types of communication, communication processes can be prioritized in the process settings 1906 over other processes, such as by allocating more processor system bandwidth to the processes than to other processes at the particular pillar location. Thus, the process settings 1906 can be utilized to allocate available resources (e.g., processor system, memory, battery, and so forth) to different processes at different pillar locations.

The security settings 1908 can be leveraged to specify different security-related behaviors at different pillar locations. For instance, if a particular pillar location is known to be content-sensitive (e.g., a family room at home, a conference room at work), the security settings 1908 can be configured to restrict presentation of certain types of content at the pillar location, such as video content. Such content restriction may be implemented in different ways, such as by preventing playback of restricted content, or by requiring express user authentication prior to allowing playback.

As another example, the security settings 1908 can specify usage restrictions on certain apps at different pillar locations, such as apps that may enable access to sensitive information, such as financial data, medical data, work-related data, and so forth. For instance, if a particular pillar location is specified as being accessible to potentially untrusted individuals (e.g., a public location such as a coffee shop), the security settings 1908 can be configured to require user authentication for access to apps that allow access sensitive information, even when the mobile device 102 is unlocked. Accordingly, the security settings 1908 can enable security settings for the mobile device 102 to be customized for different pillar locations.

The pillar profiles 622 further include path information 1912, which is representative of information that identifies different attributes of pillar paths, which are described in detail below. The path information 1912, for instance, includes path profiles for different paths of device movement that are detected relative to different respective instances of pillar locations identified in the pillar profiles 622.

Thus, these various collections of settings included in the activity profiles 1902 provide for tailored user experiences and device behaviors to be created for individual instances of pillar locations. In at least some implementations, the settings for a particular activity profile 1902 can be applied automatically and independent of user input when the mobile device 102 is detected as being present at a respective pillar location.

Figure 20:
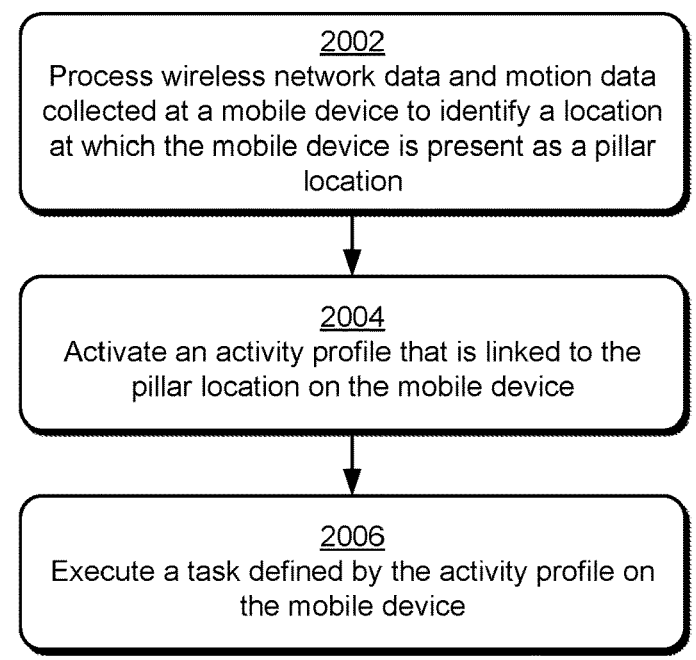
FIG. 20 depicts a method for applying a pillar profile to a device at a pillar location in accordance with one or more implementations described herein.

FIG. 20 depicts a method 2000 for applying a pillar profile to a device at a pillar location. In at least some implementations, the method is performed in conjunction with the pillar management module 112 detecting the mobile device 102 as being present at a pillar location.

At 2002, wireless network data and motion data collected at a mobile device is processed to identify a location at which the mobile device is present as a pillar location. The pillar management module 112, for instance, determines based on the motion data that the mobile device 102 exhibits little or no movement over a period of time. Accordingly, the pillar management module 112 collects wireless scan data and matches the wireless scan data to a pillar signature 624 for a pillar profile 622 of a previously-marked pillar location.

At 2004, an activity profile that is linked to the pillar location is activated on the mobile device. For example, the pillar management module 112 marks a particular activity profile 1902 as an active activity profile at the current pillar location. Thus, various attributes and behaviors of the active activity profile 1902 can be applied and enforced while the mobile device 102 is detected as present at the particular pillar location.

At 2006, a task defined by the activity profile is executed on the mobile device. The pillar management module 112, for instance, applies the active activity profile 1902 for the pillar location to configure different settings and behaviors of the mobile device 102. Examples of different settings that can be configured based on a pillar location are detailed above, such as with reference to the scenario 1900. In at least some implementations, the pillar management module 112 can cause further actions to be performed based on settings specified in the active activity profile 1900, such as to apply the settings to initiate and/or reconfigure events defined by the various settings of the activity profile.

Figure 21:
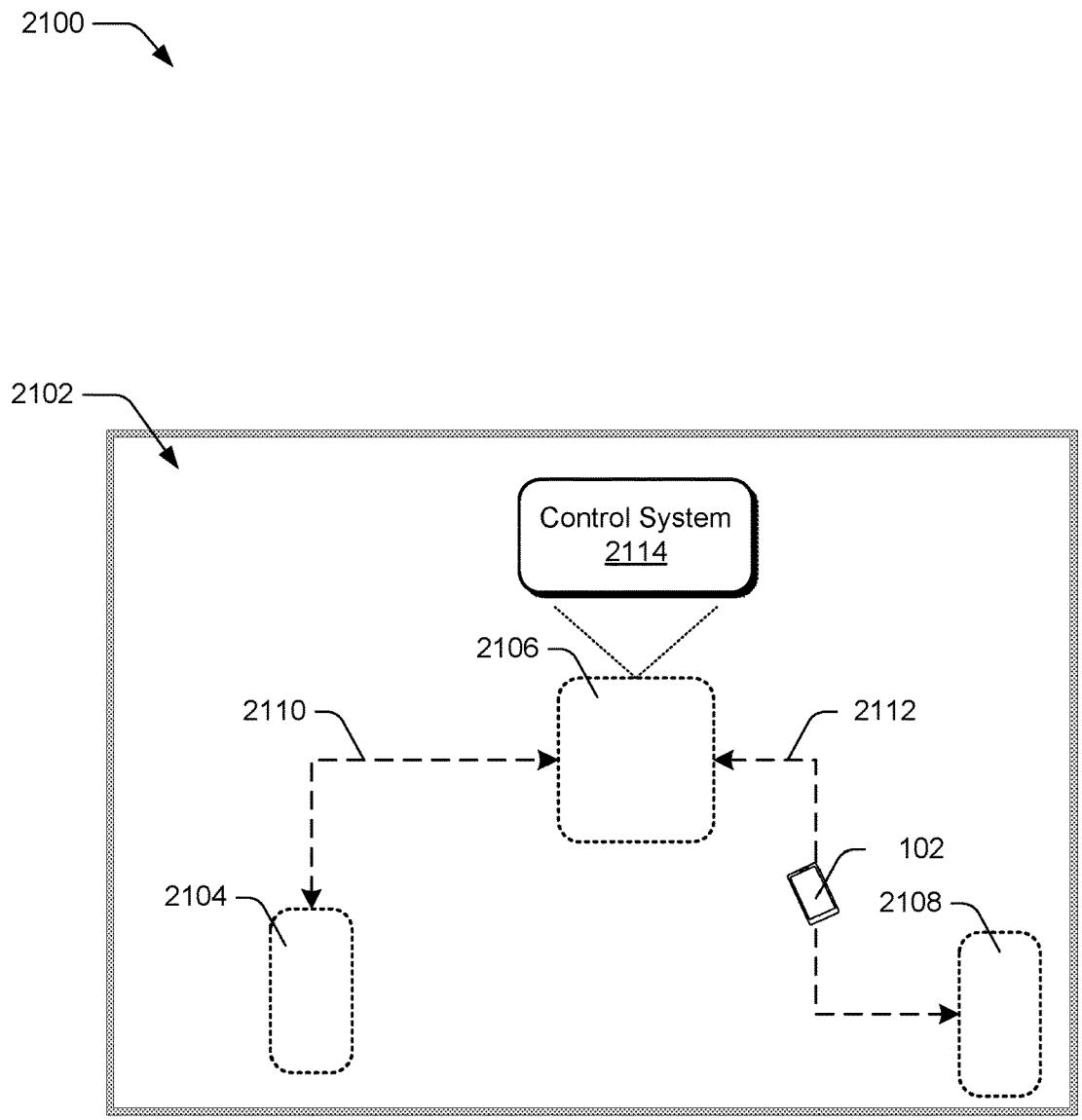
FIG. 21 depicts a scenario for generating path information for paths between different pillar locations in accordance with one or more implementations described herein.

FIG. 21 depicts a scenario 2100 for generating path information for paths between different pillar locations. The scenario 2100 includes a POI 2102 with pillar locations 2104, 2106, 2108 within the POI 2102. Generally, the pillar locations 2104-2108 are generated utilizing techniques described above for detecting and marking pillar locations.

The scenario 2100 further depicts a pillar path 2110 between the pillar locations 2104, 2106, and a pillar path 2112 between the pillar locations 2106, 2108. Generally, the pillar paths 2110, 2112 represent movement patterns that are observed between the respective pillar locations. For instance, by collecting wireless data and motion data over a period of time, the pillar management module 112 detects that the mobile device 102 often travels along the pillar paths 2110, 2112 when moving between the respective pillar locations 2104, 2106, 2108.

As one example implementation, consider that the POI 2102 represents a place of employment where the user 106 works and often carries the mobile device 102 to different locations within the POI 2102. Further, the pillar locations 2104-2108 represent pillar locations within the place of employment, such as the user's office where the user 106 has a desk, a conference room, and a break room. Thus, the pillar locations 2104-2108 represent locations within the POI 2102 that the user 106 frequently spends time with the mobile device 102, and thus are marked as pillar locations. Further, the pillar paths 2110, 2112 represent movement paths that the user 106 typically uses to move between the respective pillar locations.

Generally, knowledge of the pillar paths 2110, 2112 can be used for various purposes, such as triggering different tasks based on detecting the mobile device 102 moving along one of the pillar paths. For instance, consider an example where the pillar location 2106 represents a conference room and the pillar location 2108 represents the user's desk. Accordingly, when the pillar management module 112 detects that the mobile device 102 exits the pillar location 2108 and travels along the pillar path 2112 toward the pillar location 2106, the pillar management module 112 can trigger a task in preparation for the user's arrival at the pillar location 2106.

As one example, consider that the pillar location 2106 includes a control system 2114 that can be remotely controlled to control various attributes of the pillar location 2106, such as lighting, temperature control, multimedia devices, and so forth. Accordingly, when the mobile device 102 is detected moving along the pillar path 2112 toward the pillar location 2106, the pillar management module 112 can cooperate with the client system 314 of the mobile device 102 to interact with the control system 2114 and change various environment attributes of the pillar location 2106, such as to turn on lights and/or adjust a thermostat setting. Thus, when the user 106 arrives at the pillar location 2106, the environmental attributes of the pillar location 2106 may be better suited to accommodate the user's presence. This scenario is presented for purpose of example only, and it is to be appreciated that a variety of different tasks can be performed utilizing knowledge of different pillar paths, and detection of device presence and movement in proximity to the pillar paths.

Figure 22:
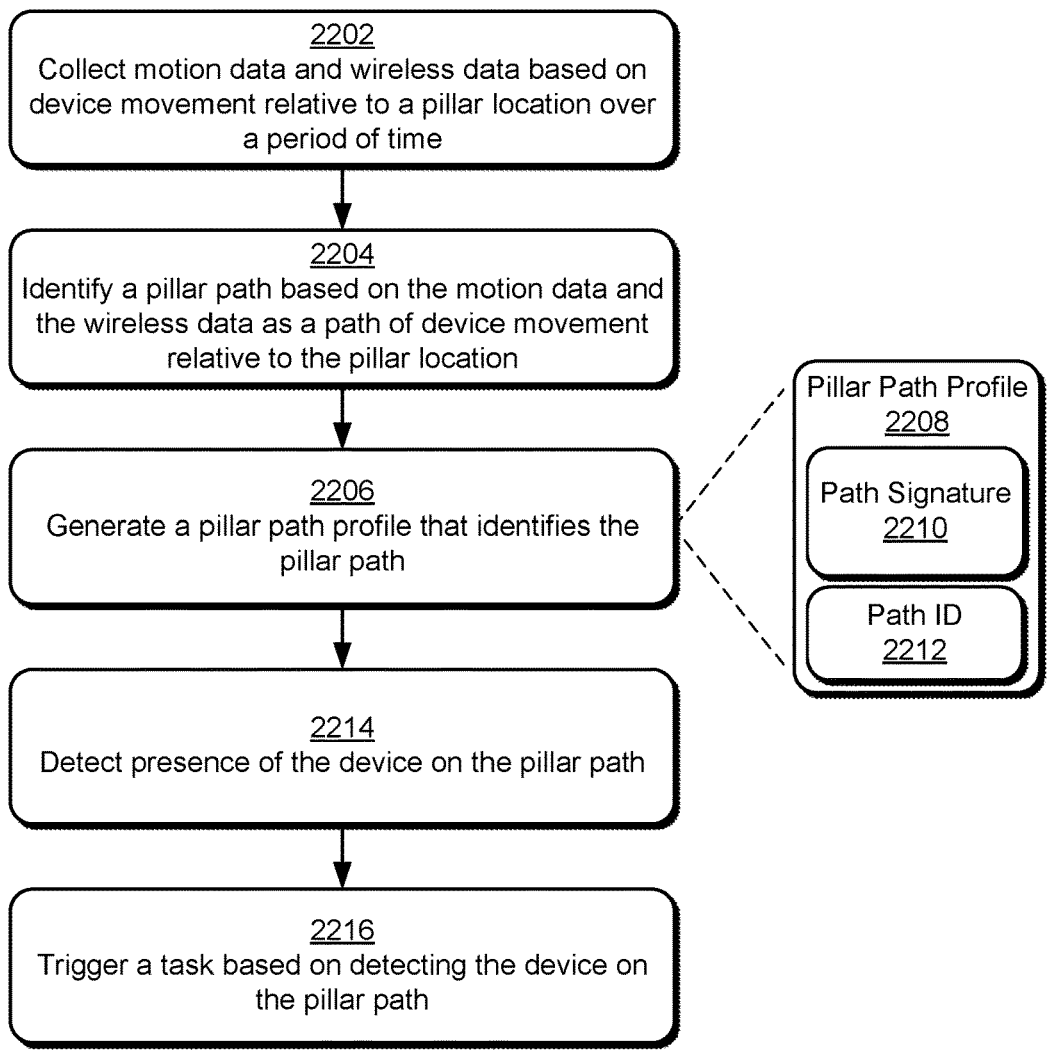
FIG. 22 depicts a method describing an example way for detecting and characterizing a pillar path in accordance with one or more implementations described herein.

FIG. 22 depicts an example method 2200 describing an example way for detecting and characterizing a pillar path. At 2202, motion data and wireless data is collected based on device movement relative to a pillar location over a period of time. The pillar management module 112, for example, collects wireless data (e.g., from the wireless module 110) and motion data (e.g., from the sensor system 108) pertaining to the mobile device 102 and based on detecting different pillar location entry and exit events.

At 2204, a pillar path is identified based on the motion data and the wireless data as a path of device movement relative to the pillar location. For instance, the pillar management module 112 identifies a common pattern in the collected wireless and motion data that indicates a path that the mobile device 102 typically travels relative to the pillar location. The common pattern, for instance, is based on wireless data detected in conjunction with movement data indicating that the mobile device 102 is moving in a particular direction relative to the pillar location.

At 2206, a pillar path profile is generated that identifies the pillar path. The pillar management module 112, for example, generates a pillar path profile 2208 that includes a path signature 2210 and a path ID 2212 that identifies the pillar path. In at least one implementation, the path signature 2210 includes a wireless signature and a movement signature for the pillar path. The wireless signature includes wireless information such as BSSIDs for network connectivity devices 120, RSSI signature, network ID(s), and so forth, detected along the pillar path. Further, the movement signature identifies various detected movement patterns along the pillar path, such as direction of movement, changes in direction of movement, typical velocity of movement, and so forth. The path ID 2212 generally represents an identifier generated for the pillar path that can be utilized to differentiate the pillar path from other pillar paths. In at least one implementation, the pillar path profile 2208 is stored as part of and/or in conjunction with the path information 1912 for a respective pillar profile 622 of a respective pillar location.

At 2214, presence of the device on the pillar path is detected. For instance, subsequent to generating the pillar path profile 2208, the pillar management module 112 detects wireless data and motion data that matches the path signature 2210. Thus, the pillar management module 112 determines that the mobile device 102 is present on the pillar path. At 2216, a task is triggered based on detecting the device on the pillar path. The pillar management module 112, for example, triggers a task that is relevant to the pillar path, such as adjusting an environmental attribute of a pillar location that is located along the pillar path.

As another example, the task can include outputting a location-specific suggestion that is relevant to the location of the pillar path. For instance, consider that the pillar management module 112 knows that the pillar path is on the way to a user's garage and also knows that the current weather is very cold. Accordingly, the pillar management module 112 can automatically output a notification suggesting that the user remember to bring their coat due to the cold weather. Thus, a task that is performed on a pillar path can consider location and environmental attributes.

Figure 23:
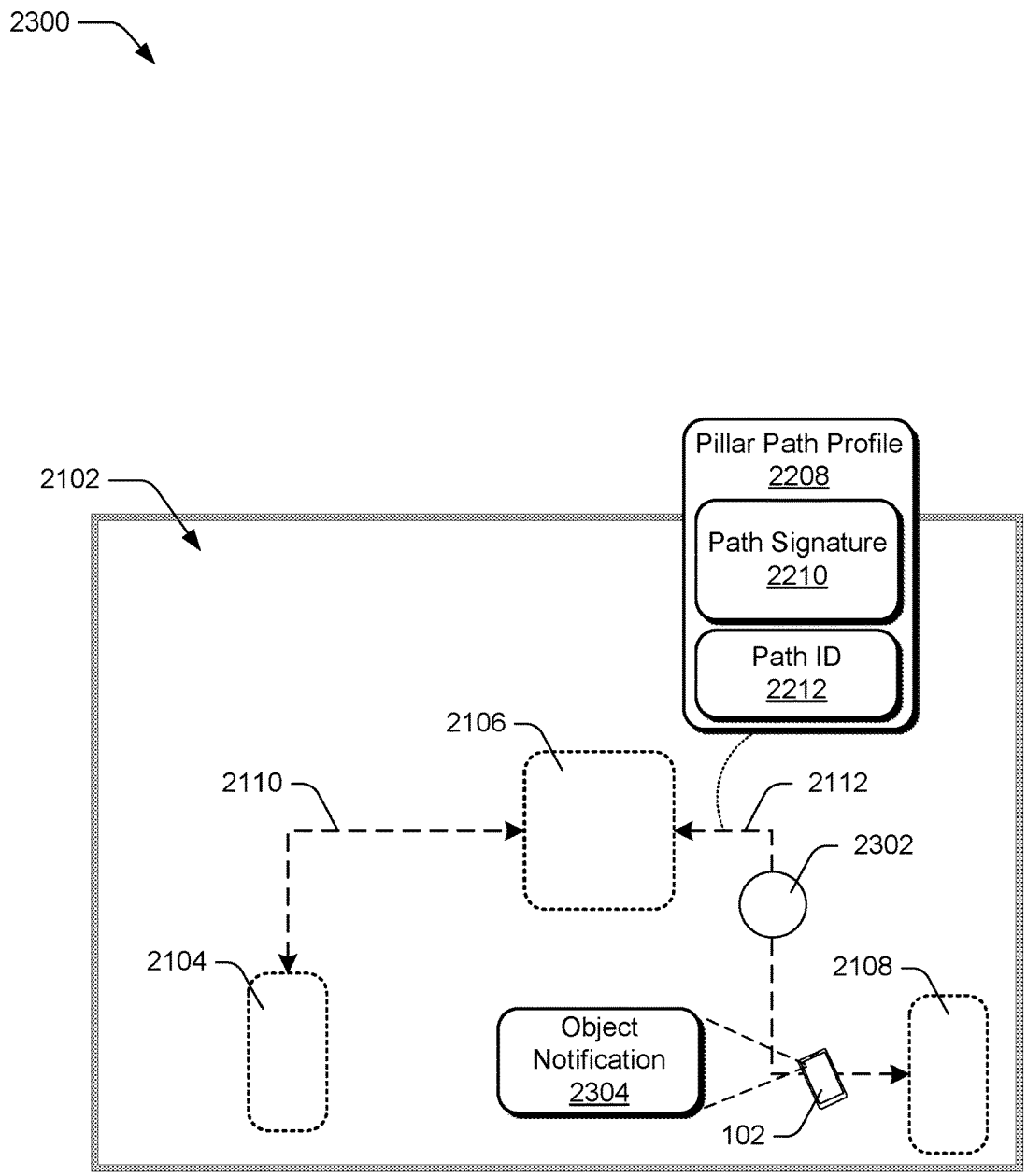
FIG. 23 depicts a scenario for determining that an object is placed on a pillar path in accordance with one or more implementations described herein.

FIG. 23 depicts a scenario 2300 for determining that an object is placed on a pillar path. The scenario 2300, for instance, represents a continuation of the scenario 2100, above. In the scenario 2300, an object 2302 is placed along the pillar path 2112. Generally, the object 2302 represents a physical object that at least partially obstructs the pillar path 2112, such as a chair, a box, a person, and so forth. The presence of the object 2302 on the pillar path 2112 causes a change in the path signature 2210 for the pillar path 2112. For instance, a wireless signature of the pillar path 2112 is altered due to the physical obstruction that the object 2302 presents along the pillar path 2112. This can be due to different signal-related phenomena, such as signal blocking, signal deflection, signal disruption, and so forth, caused by the object 2302.

Accordingly, the pillar management module 112 detects the altered wireless signature and generates an object notification 2304 that is output via the mobile device 102. The object notification 2304, for instance, indicates that an obstruction is detected along the pillar path 2112 and can take various forms, such as a visual notification, an audible notification, a tactile notification, and so forth. Generally, the object notification 2304 can be useful for different purposes, such as for individuals that may have a vision impairment and thus may have a reduced ability to see the object 2302. Thus, by characterizing a pillar path based on its wireless signature, techniques described herein can detect changes in a physical arrangement of the pillar path, and can provide notifications of such changes.

Figure 24:
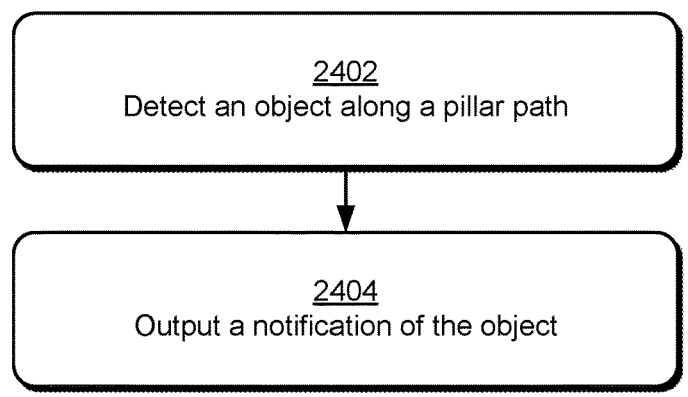
FIG. 24 depicts a method describing an example way for detection and notification of an object on a pillar path in accordance with one or more implementations described herein.

FIG. 24 depicts a method 2400 describing an example way for detection and notification of an object on a pillar path. At 2402, an object is detected on a pillar path. The pillar management module 112, for instance, detects a change in a wireless signature along a pillar path, such as a change in RSSI of a network connectivity device 120 known to transmit wireless signal along the pillar path.

At 2404, a notification of the object is output. The pillar management module 112, for example, outputs a notification of the object on the mobile device 102. As mentioned previously, the notification can take various forms, such as a visual notification, an audible notification, a tactile notification, and so forth.

Thus, implementations of pillar location for a mobile device provide ways for defining fine-tuned pillar locations while conserving devices resources, such as battery power, processor bandwidth, wireless radio, and so forth.

The example methods described above may be performed in various ways, such as for implementing different aspects of the systems and scenarios described herein. Generally, any services, components, modules, methods, and/or operations described herein can be implemented using software, firmware, hardware (e.g., fixed logic circuitry), manual processing, or any combination thereof. Some operations of the example methods may be described in the general context of executable instructions stored on computer-readable storage memory that is local and/or remote to a computer processing system, and implementations can include software applications, programs, functions, and the like. Alternatively or in addition, any of the functionality described herein can be performed, at least in part, by one or more hardware logic components, such as, and without limitation, Field-programmable Gate Arrays (FPGAs), Application-specific Integrated Circuits (ASICs), Application-specific Standard Products (ASSPs), System-on-a-chip systems (SoCs), Complex Programmable Logic Devices (CPLDs), and the like. The order in which the methods are described is not intended to be construed as a limitation, and any number or combination of the described method operations can be performed in any order to perform a method, or an alternate method.

Figure 25:
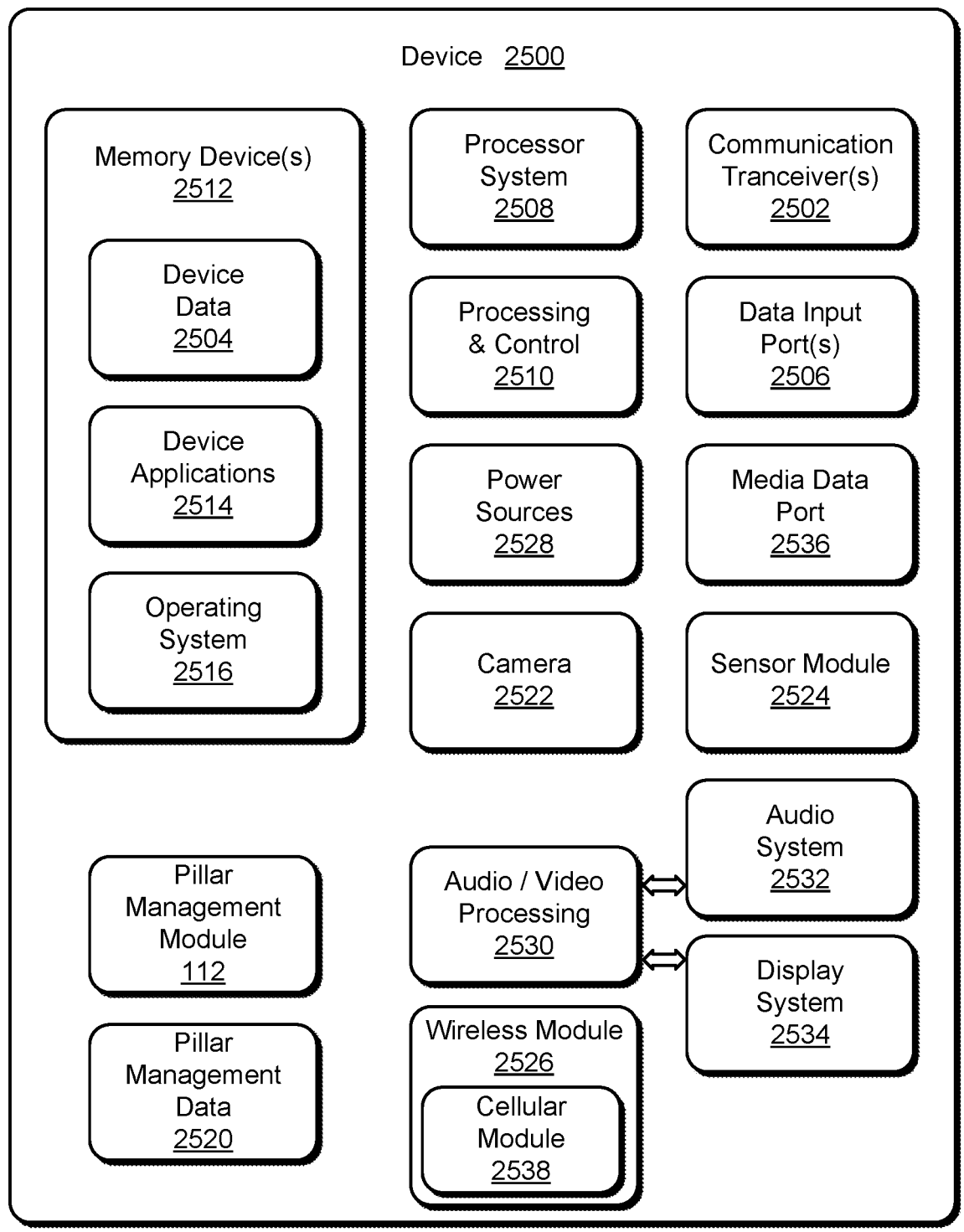
FIG. 25 illustrates various components of an example device that can implement aspects of pillar location for a mobile device.

FIG. 25 illustrates various components of an example device 2500 in which aspects of pillar location for a mobile device can be implemented. The example device 2500 can be implemented as any of the devices described with reference to the previous FIGS. 1-24, such as any type of mobile device, mobile phone, mobile device, wearable device, tablet, computing, communication, entertainment, gaming, media playback, and/or other type of electronic device. For example, the mobile device 102 as shown and described with reference to FIGS. 1-24 may be implemented as the example device 2500. In a wearable device implementation, the device may include any one or combination of a watch, armband, wristband, bracelet, glove or pair of gloves, glasses, jewelry items, clothing items, any type of footwear or headwear, and/or other types of wearables.

The device 2500 includes communication transceivers 2502 that enable wired and/or wireless communication of device data 2504 with other devices. The device data 2504 can include any of device identifying data, device location data, wireless connectivity data, and wireless protocol data. Additionally, the device data 2504 can include any type of audio, video, and/or image data. Example communication transceivers 2502 include wireless personal area network (WPAN) radios compliant with various IEEE 2502.15 (Bluetooth™) standards, wireless local area network (WLAN) radios compliant with any of the various IEEE 2502.11 (Wi-Fi™) standards, wireless wide area network (WWAN) radios for cellular phone communication, wireless metropolitan area network (WMAN) radios compliant with various IEEE 2502.16 (WiMAX™) standards, and wired local area network (LAN) Ethernet transceivers for network data communication.

The device 2500 may also include one or more data input ports 2506 via which any type of data, media content, and/or inputs can be received, such as user-selectable inputs to the device, messages, music, television content, recorded content, and any other type of audio, video, and/or image data received from any content and/or data source. The data input ports may include USB ports, coaxial cable ports, and other serial or parallel connectors (including internal connectors) for flash memory, DVDs, CDs, and the like. These data input ports may be used to couple the device to any type of components, peripherals, or accessories such as microphones and/or cameras.

The device 2500 includes a processing system 2508 of one or more processors (e.g., any of microprocessors, controllers, and the like) and/or a processor and memory system implemented as a system-on-chip (SoC) that processes computer-executable instructions. The processor system may be implemented at least partially in hardware, which can include components of an integrated circuit or on-chip system, an application-specific integrated circuit (ASIC), a field-programmable gate array (FPGA), a complex programmable logic device (CPLD), and other implementations in silicon and/or other hardware. Alternatively or in addition, the device can be implemented with any one or combination of software, hardware, firmware, or fixed logic circuitry that is implemented in connection with processing and control circuits, which are generally identified at 2510. The device 2500 may further include any type of a system bus or other data and command transfer system that couples the various components within the device. A system bus can include any one or combination of different bus structures and architectures, as well as control and data lines.

The device 2500 also includes computer-readable storage memory 2512 (e.g., memory devices) that enable data storage, such as data storage devices that can be accessed by a computing device, and that provide persistent storage of data and executable instructions (e.g., software applications, programs, functions, and the like). Examples of the computer-readable storage memory 2512 include volatile memory and non-volatile memory, fixed and removable media devices, and any suitable memory device or electronic data storage that maintains data for computing device access. The computer-readable storage memory can include various implementations of random access memory (RAM), read-only memory (ROM), flash memory, and other types of storage media in various memory device configurations. The device 2500 may also include a mass storage media device.

The computer-readable storage memory 2512 provides data storage mechanisms to store the device data 2504, other types of information and/or data, and various device applications 2514 (e.g., software applications). For example, an operating system 2516 can be maintained as software instructions with a memory device and executed by the processing system 2508. The device applications may also include a device manager, such as any form of a control application, software application, signal-processing and control module, code that is native to a particular device, a hardware abstraction layer for a particular device, and so on.

Computer-readable storage memory 2512 represents media and/or devices that enable persistent and/or non-transitory storage of information in contrast to mere signal transmission, carrier waves, or signals per se. Computer-readable storage memory 2512 do not include signals per se or transitory signals.

In this example, the device 2500 includes the pillar management module 112 that implements aspects of pillar location for a mobile device, and may be implemented with hardware components and/or in software as one of the device applications 2514, such as when the device 2500 is implemented as the mobile device 102. In implementations, the pillar management module 112 may include independent processing, memory, and logic components as a computing and/or electronic device integrated with the device 2500. The device 2500 also includes pillar management data 2520 for implementing aspects of pillar location for a mobile device, and may include data from the pillar management module 112.

In this example, the example device 2500 also includes a camera 2522 and a sensor module 2524. Generally, the sensor module 2524 can be implemented with various sensors, such as a gyroscope, an accelerometer, and/or other types of sensors to sense different physical and/or logical phenomena relative to the device 2500.

The device 2500 also includes a wireless module 2526, which is representative of functionality to perform various wireless communication tasks. For instance, for the mobile device 102, the wireless module 2526 can be leveraged to scan for and detect wireless networks, as well as negotiate wireless connectivity to wireless networks for the mobile device 102. The device 2500 can also include one or more power sources 2528, such as when the device is implemented as a mobile device. The power sources 2528 may include a charging and/or power system, and can be implemented as a flexible strip battery, a rechargeable battery, a charged super-capacitor, and/or any other type of active or passive power source. Generally, utilizing implementations of pillar location for a mobile device enables the power sources 2528 to be conserved as part of a wireless network connectivity process.

The device 2500 also includes an audio and/or video processing system 2530 that generates audio data for an audio system 2532 and/or generates display data for a display system 2534. The audio system and/or the display system may include any devices that process, display, and/or otherwise render audio, video, display, and/or image data. Display data and audio signals can be communicated to an audio component and/or to a display component via an RF (radio frequency) link, S-video link, HDMI (high-definition multimedia interface), composite video link, component video link, DVI (digital video interface), analog audio connection, or other similar communication link, such as media data port 2536. In implementations, the audio system and/or the display system are integrated components of the example device. Alternatively, the audio system and/or the display system are external, peripheral components to the example device.

The device 2500 further includes a cellular module 2538, such as part of the wireless module 2526. Generally, the cellular module 2538 enables different types of wireless cellular communication, such as via any suitable wireless cellular protocol. Further, the cellular module 2538 enables detection of wireless cellular signal and attributes of wireless cellular signal.

Although implementations of pillar location for a mobile device have been described in language specific to features and/or methods, the subject of the appended claims is not necessarily limited to the specific features or methods described. Rather, the features and methods are disclosed as example implementations of pillar location for a mobile device, and other equivalent features and methods are intended to be within the scope of the appended claims. Further, various different examples are described and it is to be appreciated that each described example can be implemented independently or in connection with one or more other described examples. Additional aspects of the techniques, features, and/or methods discussed herein relate to one or more of the following:

A method, including: processing wireless network data and motion data collected at a mobile device to identify a location at which the mobile device is present multiple times over a period of time; identifying, based on said processing, the location as a pillar location candidate; outputting a notification of the pillar location candidate, the notification including a user selectable option to verify whether the location is to be marked as a pillar location; generating, responsive to a selection of the selectable option, a pillar profile that includes data describing a wireless profile for the pillar location; and causing a task to be performed on the mobile device responsive to said detecting that the mobile device is present at the pillar location.

In addition to any of the above-recited methods, one or more of the following: wherein said identifying the location as a pillar candidate includes determining that learning criteria for identifying the location as a pillar location is satisfied; wherein the notification of the pillar location includes one or more of a graphical notification or an audible notification; further including: outputting an unlock prompt that queries whether the user would like the mobile device to automatically unlock at the pillar location; and causing, responsive to user acceptance of the unlock prompt, the mobile device to automatically unlock when detected at the pillar location; further including: outputting a customize prompt that queries whether the user would like to initiate a customization process for customizing settings of the pillar location; and causing, responsive to user acceptance of the customize prompt, the customization process to be initiated for customizing one or more settings of the pillar location; further including: outputting a pillar settings user interface as part of the customization process, the pillar settings user interface including a permissions control that is selectable to initiate a permissions setting process; and causing, responsive to user acceptance of the permissions control, the permissions setting process to be initiated for setting one or more permissions for the pillar location; wherein the pillar settings user interface includes a location control that is selectable to initiate a location customization process, and wherein the method further includes: receiving a user selection of the location control; and causing, responsive to the selection of the location control, the location customization process to be initiated to enable one or more of a size or a position of the pillar location to be user customized; further including: identifying a pillar path as a path of movement of the mobile device relative to the pillar location; generating a pillar path profile that identifies the pillar path, the pillar path profile including a wireless signature for the pillar path; detecting that the mobile device is present at the pillar path by matching current wireless network data collected at the mobile device to the wireless signature for the pillar path; and causing a further task to be triggered on the mobile device responsive to detecting that the mobile device is present at the pillar path; wherein the further task includes causing an environmental attribute of the pillar location to be adjusted; wherein the method further includes defining a secure geofence using the pillar location along with one or more other defined pillar locations; further including: detecting, based on a change in the wireless signature for the pillar path, a physical object on the pillar path; and outputting a notification of the physical object.

A system including: one or more processors; and one or more computer-readable storage memory storing instructions that are executable by the one or more processors to perform operations including: identifying, based on wireless network data and motion data collected at a mobile device, a location as a pillar location; presenting a notification of the pillar location, the notification including a user selectable option to customize one or more of a size or a position of the pillar location; receiving user interaction to interact with the selectable option to manipulate one or more of the size or the position of the pillar location; and generating, responsive to the user manipulation of the selectable option, a pillar profile that includes data describing a wireless profile for the pillar location and based on the user interaction with the selectable option to customize the pillar location.

In addition to any of the above-recited systems, one or more of the following: wherein said identifying the location as a pillar location is responsive to user verification of the pillar location; wherein the user selectable option includes a visual representation of a perimeter of the pillar location, and wherein the user interaction causes one or more of a manipulation of a size of the perimeter of the pillar location, or a position of the perimeter of the pillar location; wherein the notification of the pillar location includes a point of interest visual, and wherein the visual representation of the perimeter of the pillar location is positioned within the point of interest visual; wherein the user interaction causes one or more of: modifying a size of the visual representation of the perimeter of the pillar location relative to the point of interest visual; or modifying a position of the visual representation of the perimeter of the pillar location relative to the point of interest visual; wherein said identifying the location as a pillar location includes generating the wireless profile for the pillar location, and wherein said generating the pillar profile includes modifying the wireless profile based on the user interaction with the selectable option.

A mobile device including: a wireless radio system to transmit and receive wireless signal; a sensor system; and a pillar management module implemented to: collect motion data from the sensor system and wireless network data from the wireless radio system; process the wireless network data and motion data to identify a location at which the mobile device is present as a pillar location; activate, on the mobile device, an activity profile that is linked to the pillar location; and execute a task defined by the activity profile on the mobile device.

In addition to any of the above-recited mobile devices, one or more of the following: wherein the activity profile is generated based on a user behavior previously observed at the pillar location; wherein the task includes one or more of: providing a suggestion of a device that is available near the pillar location for outputting media; or configuring an activity level of a processor system of the mobile device based on a processor configuration specified in the activity profile.

The invention claimed is:

1. A method, comprising:
    processing wireless network data and motion data collected at a mobile device to identify a location at which the mobile device is present multiple times over a period of time;
    identifying, based on said processing, the location as a pillar location candidate;
    outputting a notification of the pillar location candidate, the notification including a user selectable option to verify whether the location is to be marked as a pillar location;
    generating, responsive to a selection of the selectable option, a pillar profile that includes data describing attributes of wireless signal detected at the pillar location;
    identifying a travel path adjacent the pillar location based on motion data describing one or more entry and exit events relative to the pillar location, and generating a pillar path profile describing a wireless signature that includes attributes of wireless signal detected along the travel path;
    detecting, based on a change in the wireless signature for the pillar path, a physical object on the pillar path; and
    outputting a notification indicating that the physical object is detected on the pillar path.

2. The method as recited in claim 1, wherein said identifying the location as a pillar candidate comprises determining that learning criteria for identifying the location as a pillar location is satisfied.

3. The method as recited in claim 1, wherein the notification of the pillar location comprises one or more of a graphical notification or an audible notification.

4. The method as recited in claim 1, further comprising:
    outputting an unlock prompt that queries whether the user would like the mobile device to automatically unlock at the pillar location; and
    causing, responsive to user acceptance of the unlock prompt, the mobile device to automatically unlock when detected at the pillar location.

5. The method as recited in claim 1, further comprising:
    outputting a customize prompt that queries whether the user would like to initiate a customization process for customizing settings of the pillar location; and
    causing, responsive to user acceptance of the customize prompt, the customization process to be initiated for customizing one or more settings of the pillar location.

6. The method as recited in claim 5, further comprising:
    outputting a pillar settings user interface as part of the customization process, the pillar settings user interface including a permissions control that is selectable to initiate a permissions setting process; and
    causing, responsive to user acceptance of the permissions control, the permissions setting process to be initiated for setting one or more permissions for the pillar location.

7. The method as recited in claim 6, wherein the pillar settings user interface includes a location control that is selectable to initiate a location customization process, and wherein the method further comprises:
    receiving a user selection of the location control; and
    causing, responsive to the selection of the location control, the location customization process to be initiated to enable one or more of a size or a position of the pillar location to be user customized.

8. The method as recited in claim 1, further comprising:
    detecting that the mobile device is present at the pillar path by matching current wireless network data collected at the mobile device to the wireless signature for the pillar path; and
    causing a further task to be triggered on the mobile device responsive to detecting that the mobile device is present at the pillar path.

9. The method as recited in claim 8, wherein the further task comprises causing an environmental attribute of the pillar location to be adjusted.

10. The method as recited in claim 1, wherein the method further comprises defining a secure geofence using the pillar location along with one or more other defined pillar locations.

11. A system comprising:
one or more processors; and
one or more computer-readable storage memory storing instructions that are executable by the one or more processors to perform operations including:
identifying, based on wireless network data and motion data collected at a mobile device, a location as a pillar location;
generating a pillar profile for the pillar location, the pillar profile describing attributes of wireless signal detected at the pillar location;
presenting a notification of the pillar location, the notification including a visual representation of a perimeter of the pillar location, the visual representation configured to receive user input to manipulate one or more of a size or a position of the visual representation;
receiving user interaction to interact with the visual representation to manipulate one or more of the size or the position of the visual representation; and
modifying, responsive to the user manipulation of the visual representation, the pillar profile by modifying the description of the attributes of the wireless signal detected at the pillar location to cause one or more of a resizing or a repositioning of the pillar location.

12. The system as recited in claim 11, wherein said identifying the location as a pillar location is responsive to user verification of the pillar location.

13. The system as recited in claim 11, wherein the notification of the pillar location includes a point of interest visual, and wherein the visual representation of the perimeter of the pillar location is positioned within the point of interest visual.

14. The system as recited in claim 13, wherein the user interaction causes one or more of:
modifying a size of the visual representation of the perimeter of the pillar location relative to the point of interest visual; or
modifying a position of the visual representation of the perimeter of the pillar location relative to the point of interest visual.

15. The system as recited in claim 11, wherein said identifying the location as a pillar location comprises generating the wireless profile for the pillar location, and wherein said generating the pillar profile comprises modifying the wireless profile based on the user interaction with the visual representation of the perimeter of the pillar location.

16. A mobile device comprising:
a wireless radio system to transmit and receive wireless signal;
a sensor system; and
a pillar management module implemented to:
collect motion data from the sensor system and wireless network data from the wireless radio system;
process the wireless network data and motion data to identify a location at which the mobile device is present as a pillar location, the pillar location defined based on attributes of wireless signal detected at the location;
activate, on the mobile device, an activity profile that is linked to the pillar location; and
execute a task defined by the activity profile on the mobile device including changing an amount of processor bandwidth allocated to a particular process based on a processor allocation for the process specified in the activity profile.

17. The mobile device as recited in claim 16, wherein the activity profile is generated based on a user behavior previously observed at the pillar location.

18. The method as recited in claim 1, wherein said notification indicating that the physical object is detected on the pillar path comprises one or more of a visual notification, an audible notification, or a tactile notification.

19. The mobile device as recited in claim 16, wherein the activity profile identifies one or more hardware devices of the mobile device that are to be automatically disabled at the pillar location.

20. The mobile device as recited in claim 16, wherein said changing an amount of processor bandwidth allocated to the particular process comprises limiting processor bandwidth allocated to the particular process.

* * * * *